US007941697B2

(12) United States Patent
Mathew et al.

(10) Patent No.: US 7,941,697 B2
(45) Date of Patent: May 10, 2011

(54) FAILURE HANDLING USING OVERLAY OBJECTS ON A FILE SYSTEM USING OBJECT BASED STORAGE DEVICES

(75) Inventors: George Mathew, Foster City, CA (US); Craig K. Harmer, San Francisco, CA (US); Basant Rajan, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 254 days.

(21) Appl. No.: 12/346,374

(22) Filed: Dec. 30, 2008

(65) Prior Publication Data

US 2010/0169707 A1 Jul. 1, 2010

(51) Int. Cl.
*G06F 11/00* (2006.01)

(52) U.S. Cl. .......................................................... 714/7

(58) Field of Classification Search .................. None
See application file for complete search history.

(56) References Cited

U.S. PATENT DOCUMENTS

| 5,506,979 | A | | 4/1996 | Menon |
| 5,708,668 | A | * | 1/1998 | Styczinski .......................... 714/6 |
| 5,941,994 | A | * | 8/1999 | DeKoning et al. ................. 714/7 |
| 5,974,503 | A | * | 10/1999 | Venkatesh et al. ............ 711/114 |
| 6,222,762 | B1 | | 4/2001 | Guterman et al. |
| 6,654,831 | B1 | * | 11/2003 | Otterness et al. ............... 710/74 |
| 7,219,259 | B2 | | 5/2007 | Batchelor et al. |
| 7,231,546 | B2 | | 6/2007 | Batchelor et al. |
| 7,418,549 | B2 | * | 8/2008 | Abe .............................. 711/114 |
| 2002/0194428 | A1 | * | 12/2002 | Green ........................... 711/114 |
| 2007/0168706 | A1 | * | 7/2007 | Humlicek ......................... 714/6 |
| 2007/0226533 | A1 | * | 9/2007 | Hafner et al. ..................... 714/6 |
| 2008/0115009 | A1 | * | 5/2008 | Silfverberg et al. |
| 2008/0126839 | A1 | * | 5/2008 | Sangapu et al. .................. 714/5 |
| 2008/0126844 | A1 | * | 5/2008 | Morita et al. ..................... 714/6 |

FOREIGN PATENT DOCUMENTS

WO  WO 2004/042505  *  5/2004

OTHER PUBLICATIONS

European Search Report Application No. 09179169.9-2224 mailed Apr. 15, 2010.

* cited by examiner

*Primary Examiner* — Robert Beausoliel
*Assistant Examiner* — Neil Miles
(74) *Attorney, Agent, or Firm* — Rory D. Rankin; Meyertons, Hood, Kivlin, Kowert & Goetzel, P.C.

(57) ABSTRACT

A system and method for data storage in an array. A system includes a client coupled to a storage subsystem including data storage locations addressable as rows and columns in an array. Each column comprises a separate storage device. Each row includes redundant data. For a given row, a coordinating storage device coordinates the computation and storage of redundant data. The system detects a failure of a storage region and in response, configures an overlay storage device to temporarily overlay the failed region, maintains an association between the overlay device and the failed region, and maintains a record of changes made to the overlay device while the region is in a failed state. In response to detecting that the failed region has been restored, the system uses the association to identify the overlay device and uses the record of changes made to the overlay device to resynchronize the failed region.

20 Claims, 18 Drawing Sheets

FAILURE HANDLING USING OVERLAY OBJECTS ON A FILE SYSTEM USING OBJECT BASED STORAGE DEVICES

BACKGROUND OF THE INVENTION

1. Field of the Invention

This invention relates to computer systems and, more particularly, to data storage subsystems within computer systems.

2. Description of the Related Art

Computer systems frequently include data storage subsystems for storing data. In particular, computer systems that include multiple clients interconnected by a network increasingly share one or more data storage subsystems via a network. The data storage subsystems may include or be further coupled to storage consisting of one or more disk storage devices, tape drives, or other storage media. A computer system may also include one or more servers in which metadata describing the contents of the included storage devices is maintained.

Data storage subsystems may store data with some redundancy to allow for recovery from storage errors. There are a variety of techniques to store data redundantly, including erasure coding techniques such as Reed-Solomon encodings and RAID (Redundant Array of Independent Disks) using a variety of layouts, such as RAID-1, RAID-5, or RAID-6. These RAID layouts may be implemented within an object-based file system in which each independent storage device is treated as a disk. Each client device may convey data to the storage devices via a network. Unfortunately, some way of arbitrating write access requests from multiple clients may be needed to avoid introducing inconsistencies into the redundant data. One arbitration approach is to require each client to obtain a lock before accessing a storage location. However this approach requires that each client be responsible for and trusted to perform all of the functions involved in sequencing writes using the lock mechanism. For example, in the case of RAID-5 or RAID-6, these functions may include reading old data and old parity, computing new parity, logging the new data and new parity, and writing the new data and new parity to their respective storage locations that together constitute a part of or the whole of a row in the RAID layout. In addition, a client may be required to retrieve information from the Meta Data Server (MDS) for each write to an individual location in the RAID layout. The performance of these functions increases write latency and adds complexity and significant computational and storage overhead to each client.

In addition to the above considerations, data storage subsystems are designed to minimize the loss of data that may occur when one or more devices fail. Although RAID layouts are intended to provide high availability and fault tolerance, there may be periods of increased vulnerability to device failure during complex read or write operations if clients are responsible for maintaining the redundancy. Clients may not be trust worthy or have sufficient resources to handle errors caused by device failures in a data storage subsystem. Rather than burden the client with tasks needed to store data redundantly, including handling device failures, some object based file systems may assume that clients are not trusted and rely on individual object storage devices to cooperatively manage redundancy. However, even in such cooperative systems, there exists a need for device failures to be handled in a manner that allows for continuing read and write operations without loss of data and without burdening the system's clients. There exists a further need to be able to resynchronize a failed device when and if it recovers from the failure or fully synchronize a replacement device if a failed device does not recover soon enough without reducing the availability of storage.

In view of the above, an effective system and method for managing device failures in object based data storage subsystems that accounts for these issues are desired.

SUMMARY OF THE INVENTION

Various embodiments of a computer system and methods are disclosed. In one embodiment, a computer system includes a client coupled to a storage subsystem. The storage subsystem comprises a plurality of data storage locations addressable as rows and columns in an array. Each column of the array comprises a separate storage device. Data stored in each row of the array includes at least some redundant data. For a given row in the array, a coordinating storage device coordinates the computation and storage of redundant data. The computer system detects a failure of a storage region including at least a portion of a storage device. In response to detecting a failure, the computer system configures an overlay storage device to temporarily overlay the failed region, maintains an association between the overlay storage device and the failed region, and maintains a record of changes made to the overlay storage device while the region is in a failed state.

In a further embodiment, in response to detecting that the failed region has been restored, the computer system uses the association to identify the overlay storage device and uses the record of changes made to the overlay storage device to resynchronize the failed region. In a still further embodiment, in response to determining that the failure of the region is permanent, the computer system uses the association to identify the overlay storage device and copies data previously stored in the failed region to the overlay storage device.

In further embodiments, rows in the array utilize an erasure-coded layout such as a mirrored layout, a RAID-5 layout, or a RAID-6 layout. For a given row in the array, a coordinating storage device receives a write request from a client targeted to write data to the overlay device, calculates and stores redundancy values based on old data retrieved from non-overlay devices in the given row, and forwards write data to devices in the given row including at least the overlay device. In addition, for a given row in the array, a coordinating storage device receives a read request from a client targeted to read data from the overlay device, reconstructs data from a failed region using data retrieved from non-overlay devices in the given row, and returns the reconstructed data to the client. In one embodiment, the failure of a storage region including at least a portion of a storage device is detected by the coordinating storage device.

These and other embodiments will become apparent upon consideration of the following description and accompanying drawings.

Figure 1:
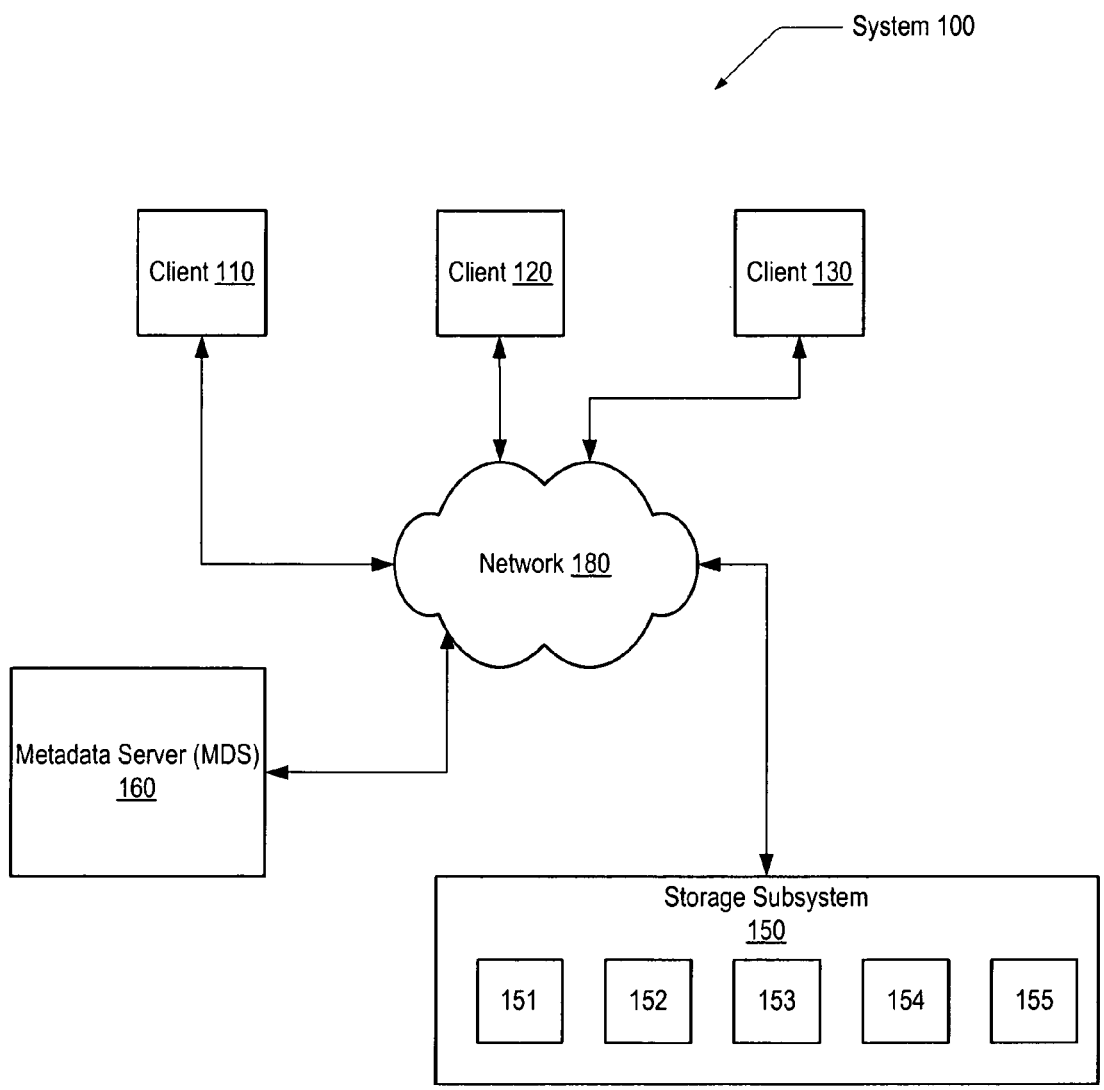
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computer system 100. As shown, system 100 includes clients 110, 120, and 130, a storage subsystem 150, and a metadata server (MDS) 160 interconnected through a network 180. Clients 110, 120, and 130 are representative of any number of stationary or mobile computers such as desktop PCs, workstations, laptops, handheld computers, blade servers, etc. Although system 100 is described as including client and servers, in alternative embodiments the functions performed by clients and servers may be performed by peers in a peer-to-peer configuration or by a combination of clients, servers, and peers.

In alternative embodiments, the number and type of clients, servers, and storage devices is not limited to those shown in FIG. 1. Almost any number and combination of servers, desktop, and mobile clients may be interconnected in system 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to system 100.

Within system 100, it may be desired to store data associated with any of clients 110, 120, and 130 within storage subsystem 150. Subsystem 150 may include individual storage devices 151-155. Storage devices 151-155 may be any of a variety of devices such as hard disks, server blades, or specialized devices, and may include a variety of memory devices such as RAM, Flash RAM, MEMS (MicroElectroMechanical Systems) storage, battery-backed RAM, and/or non-volatile RAM (NVRAM), etc. Client data may be stored within storage subsystem 150 in one of a variety of well-known layouts, such as RAID-1, RAID-DP, RAID-5, RAID-6, an erasure-coded data representation scheme, etc. in which the reliability of storage may be enhanced by redundancy and/or error correction capabilities. Metadata describing the layout of data stored in storage subsystem 150 may be stored in MDS 160. A client may retrieve metadata from MDS 160 in order to identify a desired data storage location within storage subsystem 150. In alternative embodiments, the functions of MDS 160 may be performed by any of a variety of components such as a volume configuration daemon or other storage management processes or servers depending on the type and layout of storage devices in storage subsystem 150.

In the following discussion, data may be stored in stripe units of a given size that depends on the capacity of individual storage device locations. These stripe units may be data objects, data portions, chunks, or any other segment of data suited to the individual storage devices. However, from the client view, data stripe units may be of a different size. For example, a client may convey data to a storage subsystem in stripe units of a size sufficient to fill a row across a number of storage devices arranged in an array. A client may also convey data in a size smaller than a stripe unit. A variety of stripe layouts are possible and contemplated, some of which are described in further detail below. For a given row within storage subsystem 150, one of the storage devices may be designated as a coordinating storage device. In some embodiments, data may be stored without parity and the coordinating storage device in each row may coordinate storage of individual stripe units in the other storage devices in the row. In other embodiments involving redundant layouts, the coordinating storage device may coordinate storage of data as well as coordinating parity computation. Numerous such alternatives are possible and are contemplated.

Figure 2:
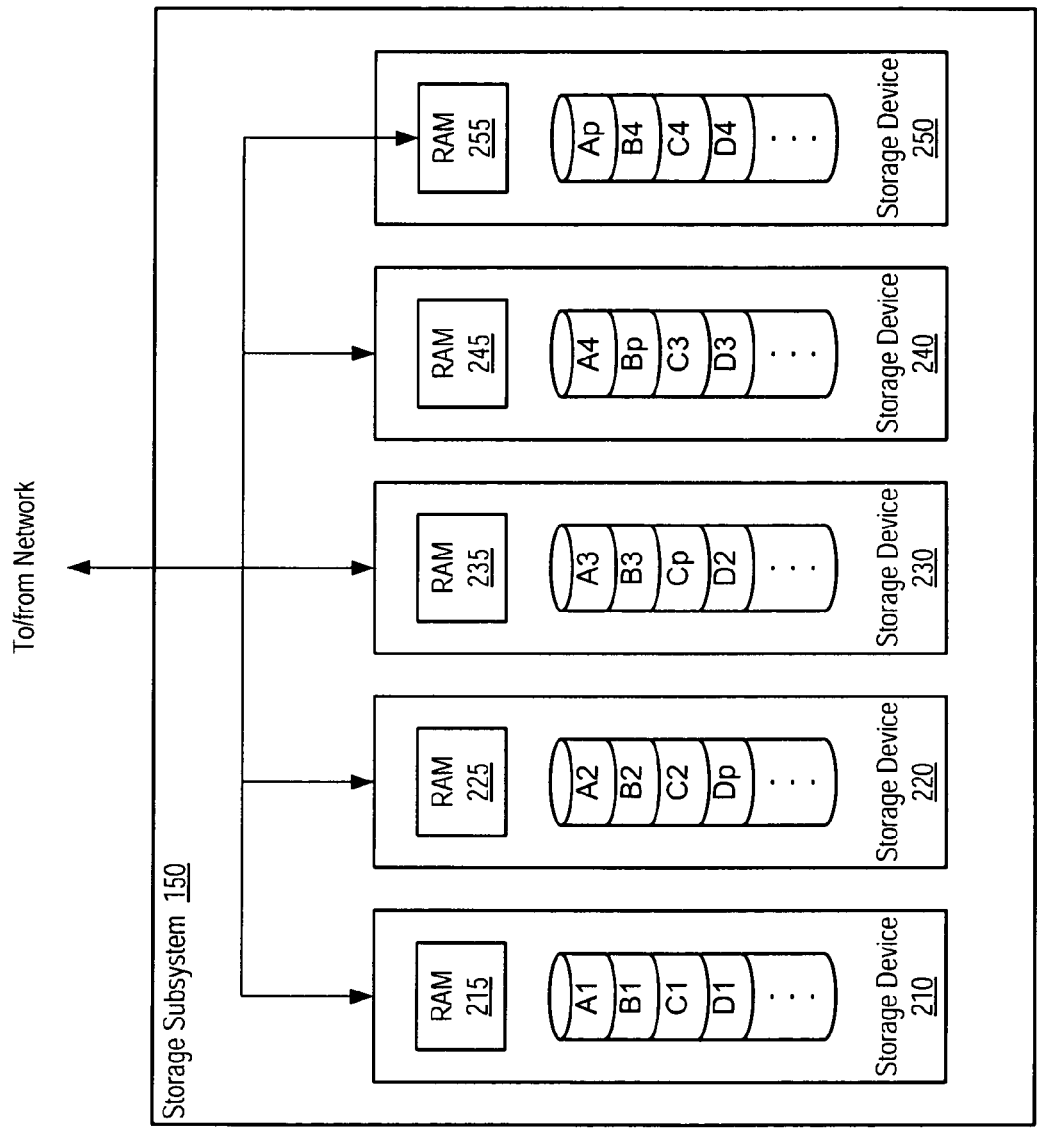
FIG. 2 is a generalized block diagram of one embodiment of a RAID-5 data storage subsystem.

Turning now to FIG. 2, a generalized block diagram of one embodiment of storage subsystem 150 is shown. In the illustrated embodiment, storage subsystem 150 includes storage devices 210, 220, 230, 240, and 250, arranged in a RAID-5 layout. Each of storage devices 210, 220, 230, 240, and 250 includes a corresponding one of a set of temporary storage devices 215, 225, 235, 245, and 255 such as random access memory (RAM). In one embodiment, storage devices 215, 225, 235, 245, and 255 may include non-volatile RAM (NVRAM). Data may be stored in stripe units striped in rows across the storage devices. In various RAID-5 embodiments, there may be a parity storage device and at least two data storage devices in each row, depending on the number of storage devices in the layout. For example, in the illustrated embodiment, a row may be defined as five stripe units each stored on one of storage devices 210, 220, 230, 240, and 250. Data may be striped across a portion of a row, a full row, or more than one row. Each row may include four data stripe units and a parity stripe unit. More particularly, the first row in the illustrated embodiment may include data stripe units A1, A2, A3, and A4 and parity stripe unit Ap stored in storage devices 210, 220, 230, 240, and 250, respectively. The second row may include data stripe units B1, B2, B3, and B4 and parity stripe unit Bp. Unlike the first row in which the parity stripe unit Ap was stored in storage device 250, the parity stripe unit Bp may be stored in storage device 240, while the data stripe units B1, B2, B3, and B4 may be stored in storage devices 210, 220, 230, and 250, respectively. The location of the parity stripe unit may be rotated among the storage devices on each successive row such as rows C and D, etc.

During operation, a client may write data to a given row as if writing to a RAID-0 layout. More specifically, the client may be told that the data is striped such that for each RAID-5 row, the entire row is stored in the storage device holding the parity stripe unit that is designated for that row and the stripe size is equal to the combined size of the other, non-parity stripe units in the row. The client may then send data for the entire row to the parity storage device. The parity storage device may then forward the one or more portions of the data to the component data storage devices in the given row according to a process that will be described in more detail below. Each storage device may store the parity or data in its associated RAM until the new parity has been calculated, at which time the write operation may be committed and the data and parity may be transferred from RAM to the associated stripe unit locations. The storage subsystem may return a write completion message to the client after the data and parity stripe units are stored in RAM but before the data and parity are transferred from RAM to the associated stripe unit locations, minimizing write latency. A dataset that is larger than the capacity of a single row may be written through a series of write operations, each having a width of one row or less and each being addressed to the corresponding parity storage device in its respective row.

Read operations may be handled in a similar manner. For example, a read request may also be sent from a client to the parity storage device in a given row. If the requested data is stored in the RAM associated with the parity storage device, the data may be retrieved and sent directly to the client in a response to the request. If the requested data is located on one or more other storage devices making up the row, the parity storage device may convey a corresponding read request to each storage device in the layout and receive in return a portion of the requested data. The parity storage device may then assemble the data and return it to the requesting client. If one or more portions of the data are located on a storage device that has failed, the parity storage device may retrieve the data from a sufficient number of the remaining storage devices making up the row and then reconstruct the missing data using the available data and parity.

A number of error scenarios will next be described. In the case of a failure of a storage device other than the parity storage device, the parity storage device may detect the failure and send a message to the MDS to report the device failure. Alternatively, the parity storage device may send an error message to the client in lieu of a write completion message. In response, the client may contact the MDS to report the error. Upon receiving an error message from the client or from the parity storage device, the MDS may select a new storage device to overlay the failed device and cause the contents of the stripe to be rebuilt based on the data stored in the remaining storage devices. If the device failure occurs before all of the devices in the row have received and stored their respective portions of data, a complete copy of the write data may be obtained from the parity storage device to complete the write operation.

In the case of a failure of the parity storage device, the MDS may recognize the failure of the parity storage device via conventional techniques such as polling, etc. and select a new storage device to overlay it. The new parity storage device may recalculate parity values by reading the data from the other storage devices and storing the resulting values in the new storage location. In some embodiments parity recalculation may be performed by another device, such as the MDS.

Figure 3:
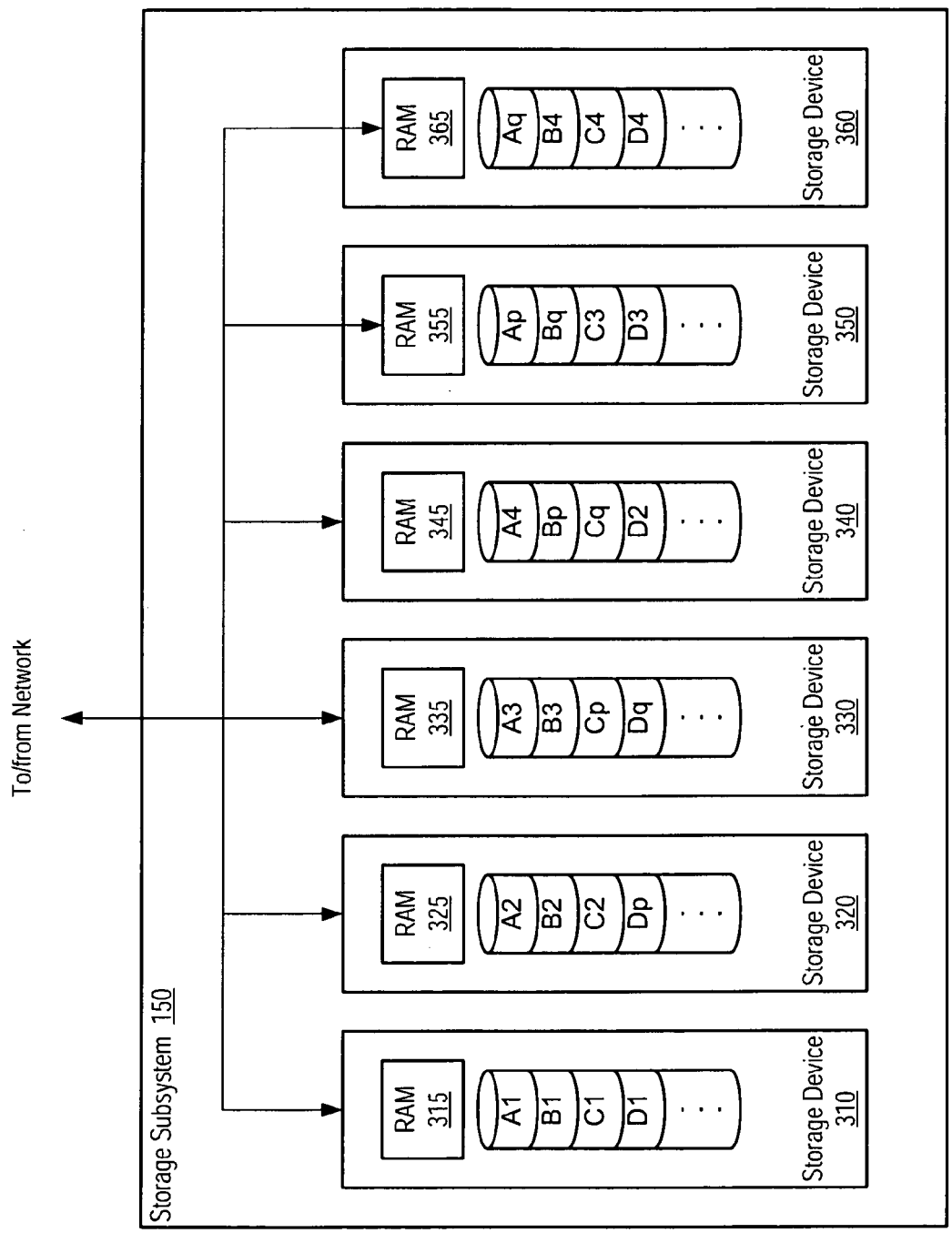
FIG. 3 is a generalized block diagram of one embodiment of a RAID-6 data storage subsystem.

FIG. 3 is a detailed block diagram of an alternative embodiment of storage subsystem 150. In the illustrated embodiment, data may be stored in storage subsystem 150 as stripe units. Storage subsystem 150 includes storage devices 310, 320, 330, 340, 350, and 360, arranged in a RAID-6 layout. Each of storage devices 310, 320, 330, 340, 350, and 360 includes a corresponding one of a set of temporary storage devices 315, 325, 335, 345, 355, and 365 such as random access memory (RAM). In one embodiment, storage devices 315, 325, 335, 345, 355, and 365 may include Flash RAM, MEMS (MicroElectroMechanical Systems) storage, battery-backed RAM, non-volatile RAM (NVRAM), or other persistent storage devices. Data may be striped across stripe units in rows on the storage devices.

In various RAID-6 embodiments, there may be two parity stripe units and at least two data stripe units in each row, depending on the number of storage devices in the layout. For example, in the illustrated embodiment, a row may be defined as six stripe units each stored on one of storage devices 310, 320, 330, 340, 350, and 360. Data may be striped across a portion of a row, a full row, or more than one row. Each row may include four data stripe units and two parity stripe units. More particularly, the first row in the illustrated embodiment may include data stripe units A1, A2, A3, and A4 and parity stripe units Ap and Aq stored in storage devices 310, 320, 330, 340, 350, and 360, respectively. The second row may include data stripe units B1, B2, B3, and B4 and parity stripe units Bp and Bq. Unlike the first row in which the parity stripe unit Ap may be stored in storage device 350 and Aq may be stored in storage device 360, the parity stripe unit Bp may be stored in storage device 340 and Bq may be stored storage device 350, while the data stripe units B1, B2, B3, and B4 may be stored in storage devices 310, 320, 330, and 360, respectively. The location of the parity storage devices may be rotated among the storage devices on each successive row such as rows C and D, etc.

During a write operation, a client may write data to a given row as if writing to a RAID-0 layout. More specifically, the client may be told that data is striped such that for each RAID-6 row, the entire row is stored in the primary parity storage device that is designated for that row (designated above with suffix letter "p") and the client stripe unit is equal to the combined size of the other, non-parity stripe units in the row. The client may then send data for the entire row to the primary parity storage device. The primary parity storage device may then forward the data to the component data storage devices and the secondary parity storage device (designated above with suffix letter "q") in the given row according to a process that will be described in more detail below. Each storage device may store the parity and/or data in its associated RAM until the new parity has been calculated, at which time the write operation may be committed and the data and parity may be transferred from RAM to the associated storage device. The storage subsystem may return a write completion message to the client after the data and parity stripe units are stored in RAM but before the data and parity are transferred from RAM to the associated storage device, minimizing write latency. A dataset that is larger than the capacity of a single row may be written through a series of write operations, each having a width of one row or less and each being addressed to the corresponding primary parity storage device in its respective row.

Read operations may be handled in a similar manner. For example, a read request may also be sent from a client to the primary parity storage device in a given row. If the requested data is stored in the RAM associated with the primary parity storage device, the data may be retrieved and sent directly to the client in a response to the request. If the requested data is located on one or more other storage devices making up the row, the primary parity storage device may convey a corresponding read request to each storage device in the layout and receive in return a portion of the requested data. The primary parity storage device may then assemble the data and return it to the requesting client. If one or more portions of the data are located on a storage device that has failed, the primary parity storage device may retrieve the data from a sufficient number of the remaining storage devices making up the row and then reconstruct the missing data using the available data and parity. Note that in the case of RAID-6 and other layouts with a significant amount of redundancy, it may not be necessary to retrieve data from all of the data and parity storage units; a subset of the data portions may be sufficient to reconstruct the missing data.

Figure 4:
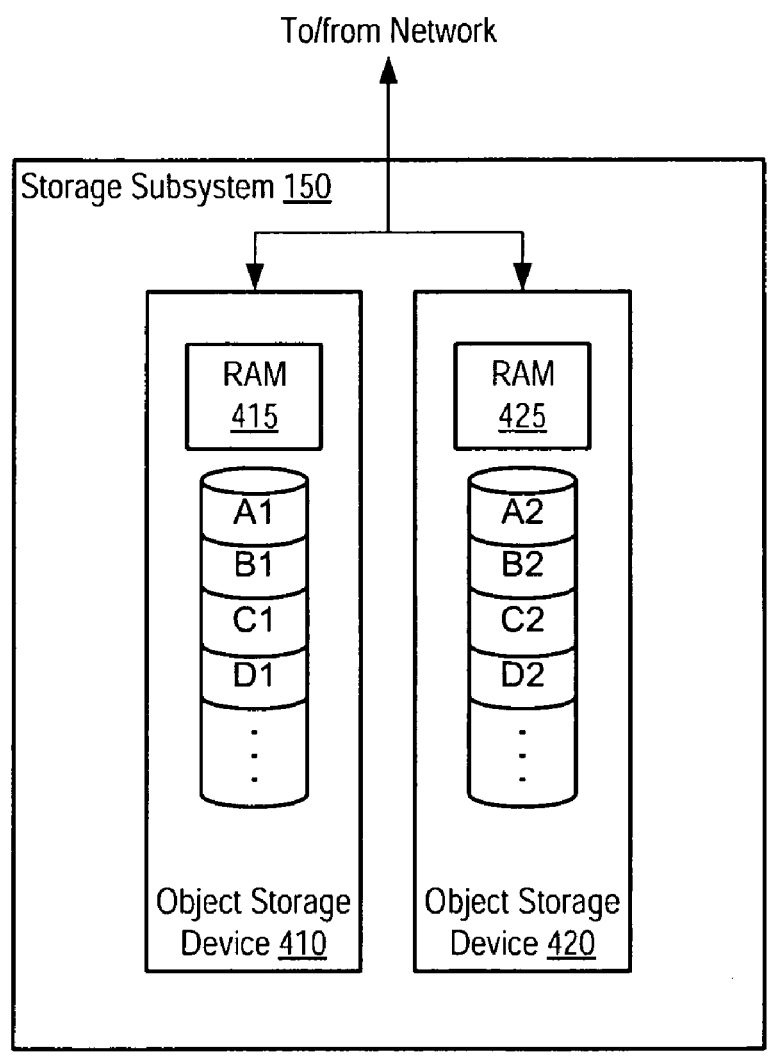
FIG. 4 is a generalized block diagram of one embodiment of a RAID-1 data storage subsystem.

FIG. 4 is a detailed block diagram of yet another alternative embodiment of storage subsystem 150. In the illustrated embodiment, data may be stored in storage subsystem 150 as stripe units. Storage subsystem 150 includes storage devices 410 and 420 arranged in a RAID-1 layout. In the illustrated embodiment, two storage devices are shown although in alternative RAID-1 layouts, more than two storage devices may be employed to increase the degree of redundancy. Each of storage devices 410 and 420 includes a corresponding one of a set of temporary storage devices 415 and 425 such as random access memory (RAM). In one embodiment, storage devices 415 and 425 may include Flash RAM, MEMS (MicroElectroMechanical Systems) storage, battery-backed RAM, non-volatile RAM (NVRAM), or other persistent storage devices. Data may be mirrored between storage devices 410 and 420. Data may be stored in a portion of a row, a full row, or more than one row. Each row may include a primary data stripe unit and a secondary stripe unit. For example, the first row in the illustrated embodiment may include data stripe unit A1 stored in storage devices 410 and data stripe unit A2 stored in storage device 420. The second row may include data stripe units B1 stored in storage devices 410 and data stripe unit B2 stored in storage device 420, etc. The location of the primary data storage device may be varied among the storage devices, such as alternating for each successive row or any other pattern that causes storage devices 410 and 420 to share responsibility for storing the primary data stripe unit.

During operation, a client may be told that the data is striped such that for each row of data, the data is stored in the primary device for the row. The client may send the data to the primary data storage device. The primary data storage device may then forward the data to the secondary data storage device in the given row. Each storage device may store the data in its associated RAM until the stripe unit is ready to be committed, providing an opportunity to sequence multiple write requests in the storage devices. The storage subsystem may return a write completion message to the client after the data stripe units are stored in RAM but before the data is transferred from RAM to the associated storage device, minimizing write latency. A dataset that is larger than the capacity of a single row may be written through a series of write operations, each having a width of one row or less and each being addressed to the corresponding primary data storage device in its respective row. It will be apparent to one of ordinary skill in the art that read operations may be similarly coordinated through the primary data storage device.

In still further embodiments of storage subsystem 150, an erasure-coding method may be employed. For example, in a Reed-Solomon scheme, the coordinating storage device may perform a calculation on K blocks of received data to produce M erasure-coded blocks such that only N of M blocks are needed to recover the original data, where N<M and usually, K<N. Numerous other suitable, redundant or erasure-coded storage schemes will be apparent to one of ordinary skill in the art. A number of embodiments of storage device 150 are described in pending U.S. patent application Ser. No. 60/976, 302, filed Sep. 28, 2007 by inventors George Mathew, Craig Harmer, Oleg Kiselev, and Ron Karr entitled "System and Method of Redundantly Storing and Retrieving Data with Cooperating Storage Devices" assigned to the assignor of the present application, the disclosure of which is incorporated herein by reference for all purposes.

The above referenced patent application includes sequence diagrams describing a number of write transactions, including writes between a client and a RAID-1 layout, a full or partial row in a RAID-5 layout, and a full or partial row in a RAID-6 layout. The diagrams and discussions presented below are based on those sequence diagrams and describe a number of read and write error scenarios for various RAID layouts.

In a mirrored layout, a number of error scenarios may occur. For example, a client may receive an error in response to sending an I/O request to a storage device if the whole storage system including the MDS is down. More specifically, the client may receive a timeout error for its I/O request to the storage device and may attempt to contact the MDS to get a new layout. When the client tries to contact the MDS to get the new layout, it may receive a timeout for the layout request, as the MDS is also unavailable. At this point the client request may fail with an I/O error.

Alternatively, a client may receive an error in response to sending data to a first storage device if only the storage device has failed. The storage device may have failed temporarily, such as from a network partition or reboot operation or permanently due to faulty hardware, etc. In either case, the client may receive a timeout error in response to sending an I/O request to the failed storage device. Once the client gets the timeout error, it may send a message to the MDS identifying the layout map and the object that gave the error. At this point the MDS may commence an error recovery for the failed storage device and return a new layout to the client.

In a further alternative, a storage device may receive an error in response to forwarding data to other storage devices as one or more of the destination storage devices may be unavailable. The storage device that forwarded the data, rather than the client as in the previous example, may send a message to the MDS. Once the MDS executes the recovery process, the storage device that received the error may retry the failed operation.

Figure 5:
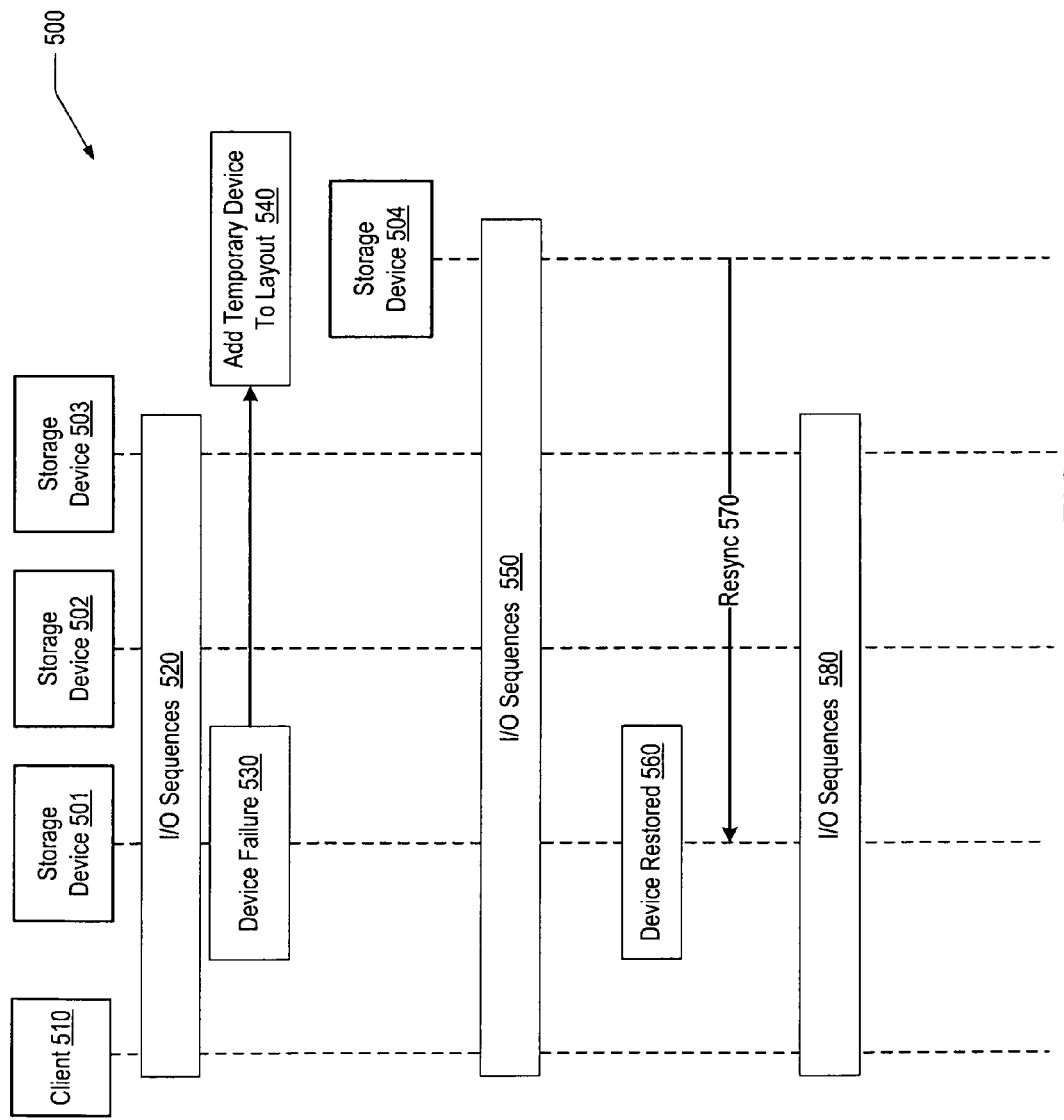
FIG. 5 illustrates one embodiment of a process for handling a device failure in a mirrored layout.

Turning now to FIG. 5, one embodiment of a process 500 for handling a device failure in a mirrored layout is illustrated. In the illustrated embodiment, a client 510 is shown coupled to a row consisting of data storage devices 501-503 and a temporary storage device 504. Device 501-503 may be configured as a three-way mirrored layout. In the illustrated embodiment, each of devices 501-504 is shown as a separate device for ease of understanding. However, in alternative embodiments, each device represents a storage object and multiple storage objects may be located on a single physical storage device. The data size is assumed to be equal to the capacity of one row. Process 500 may begin with I/O sequences (block 520) between client 510 and storage devices 501-503 that, in one embodiment, may follow the sequences presented in the above referenced patent application until a device failure occurs. By way of example, a failure of device 501 is assumed (block 530). In response to the device failure, a temporary storage device 504 may be added to the mirrored layout (block 540). Temporary device 504 may be assigned a clone attribute that points to device 501. Subsequently, I/O sequences (block 550) from client 510 addressed to storage including device 501 may proceed with device 504 overlaying device 501 according to processes that are further described below. From the point of view of client 510, device 504 overlays device 501 in the layout with other aspects of the layout remaining unchanged. Temporary device 504 may be configured to keep track of writes that modify data originally stored in device 501. By way of further example, it is assumed that at some point in time, device 501 may be restored (block 560). Consequently, device 504 may be said to overlay device 501 rather than replacing device 501. In response to the restoration of device 501, a resync process 570 may occur in which data that has been stored in device 504 during the time that device 501 was not available is copied to device 501. Subsequently, I/O sequences (block 580) between client 510 and the storage devices may resume according to the processes used in block 520. In alternative embodiments, I/O sequences may resume before the completion of resync process 570. If an I/O operation is requested that targets a region of device 501 that has not yet been resynced, the I/O operation may be delayed until resync is completed for the targeted region. It is noted that in alternative embodiments, some of the steps described above may be executed in parallel with each other or in a different order than illustrated.

Although in the above description, it is assumed that the failed device eventually is restored to operation, in some cases a failure may be sufficiently long-lasting that recovery and data resync are not practical. In such cases, a temporary device may be promoted to permanent status, replacing the failed device in a layout. A decision to promote a temporary device may be made by an MDS after a predetermined period of time or for some other reason, such as a quota failure, enospace failure, etc. as desired. Once a temporary device is promoted, write transactions that are directed to addresses in the temporary device may cause data to be stored in the now-promoted device. In addition, read transactions that are directed to addresses in the now-promoted device may cause data to be cached therein. After a period of time, the now-promoted device may be resynced with the failed device as the data of the mirrored layout are rebuilt. The resync process may proceed in a lazy fashion without requiring subsequent file I/O operations to wait.

Figure 6:
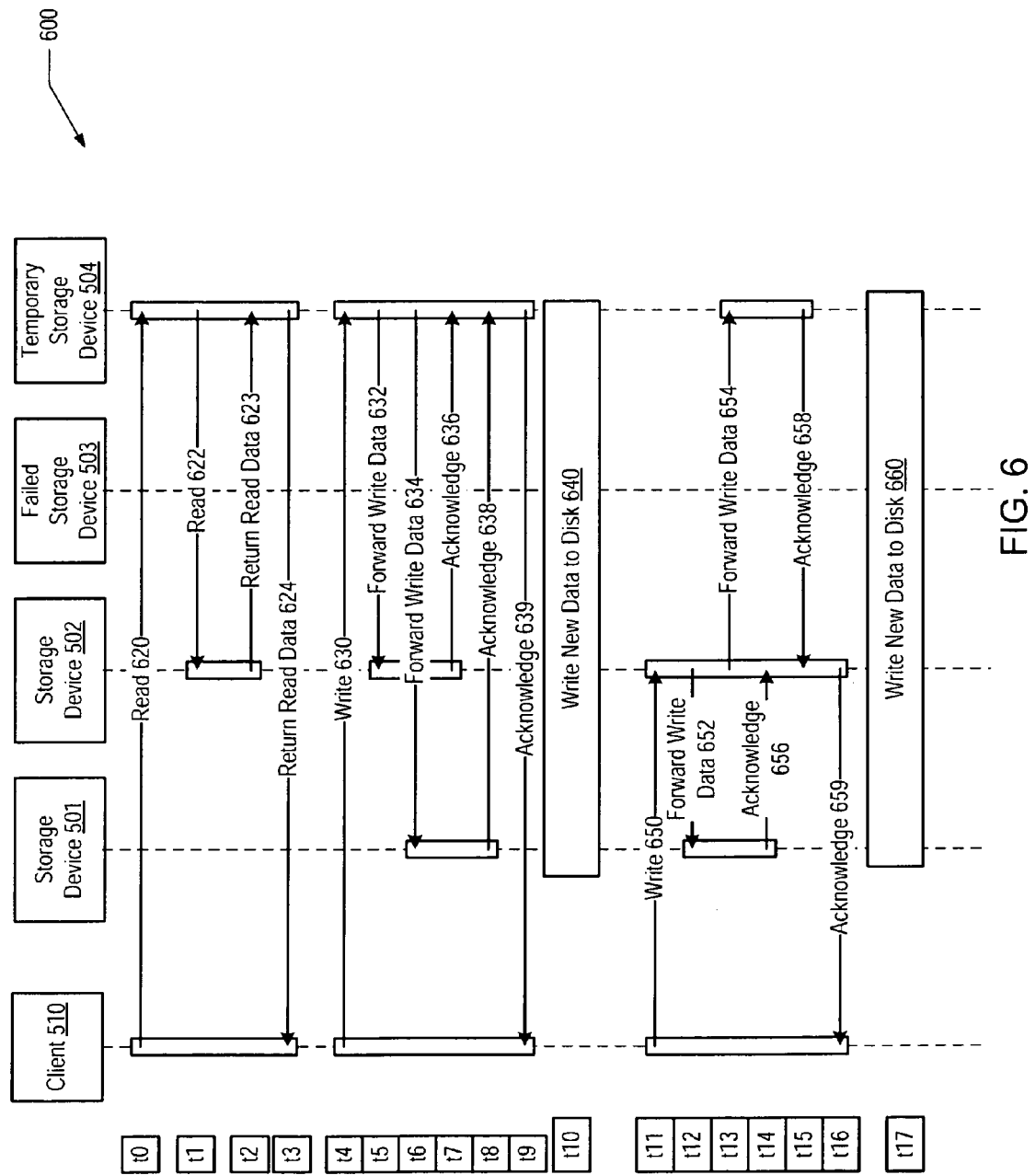
FIG. 6 is a sequence diagram illustrating one embodiment of I/O transactions between a client and a row in a mirrored layout.

After a failure causes an overlay device to be added to the mirrored layout, if a read transaction is directed to a non-failed storage device, it may be processed as if the failure never happened. Other cases are illustrated in FIG. 6, which is a sequence diagram illustrating one embodiment of I/O transactions between a client and a row in a mirrored layout. In the illustrated embodiment, as in FIG. 5, a client 510 is shown coupled to a row consisting of data storage devices 501-503 and a temporary storage device 504. At time t0, client 510 may begin a read transaction by sending a read request 620 to an object address that spans failed device 503. Client 510 need not be aware of the individual components of the row. Rather, client 510 may convey the request to a coordinating storage device. The coordinating storage device may obtain the layout of the data storage including the size of the row and the location of the targeted object, now overlaid by temporary device 504, from a metadata server, and convey the request to the targeted object. Alternatively, client 510 may obtain the layout of the data storage including the size of the row and the location of the targeted object, now overlaid by temporary device 504, from a metadata server. Once storage device 504 receives the read request, at time t1, device 504 may forward a read request 622 to another storage device since the requested data is not stored in the temporary storage device. At time t2, storage device 502 may convey return data 623 to device 504, which may respond at time t3 by forwarding the data as return data 624 to client 510, completing the read transaction. It is noted that in alternative embodiments, some of the steps described above may be executed in parallel with each other or in a different order than illustrated.

At time t4, client 510 may begin a write transaction by sending a write request 630 to an object address that spans failed device 503. Client 510 need not be aware of the individual components of the row. Rather, client 510 may convey the request to a coordinating storage device. The coordinating storage device may obtain the layout of the data storage including the size of the row and the location of the targeted object, now overlaid by temporary device 504, from a metadata server, and convey the request to the targeted object. Alternatively, client 510 may obtain the layout of the data storage including the size of the row and the location of the targeted object, now overlaid by temporary device 504, from a metadata server. Once storage device 504 receives the write request it may store the received data in RAM and, at times t5 and t6, device 504 may forward write requests 632 and 634 respectively, including copies of the write data, to the other storage devices in the mirrored layout. Storage device 502 may receive write request 632 and in response at t7, store the received data in RAM and convey an acknowledgment 636 to device 504. Storage device 501 may receive write request 634 and in response at t8, store the received data in RAM and convey an acknowledgment 638 to device 504. Once device 504 has received acknowledgments from all of the active devices in the mirrored layout, an acknowledgement 639 may be conveyed to client 510 at t9. It is noted that write complete acknowledgment 639 may not be sent to the client until the new data has been received and acknowledged by the data storage devices. This ensures that the data is redundantly stored and can be recovered in the event of the failure of any single device. Subsequently, each of devices 501, 502, and 504 may transfer the stored data from RAM to disk at t10, completing the write transaction. It is noted that in alternative embodiments, some of the steps described above may be executed in parallel with each other or in a different order than illustrated.

At time t11, client 510 may begin a second write transaction by sending a write request 650 to an object address that is located in device 502. Client 510 need not be aware of the individual components of the row. Once storage device 502 receives the write request it may store the received data in RAM and, at times t12 and t13, device 504 may forward write requests 652 and 654 respectively, including copies of the write data, to the other storage devices in the mirrored layout. Storage device 501 may receive write request 652 and in response at t14, store the received data in RAM and convey an acknowledgment 656 to device 502. Storage device 504 may receive write request 654 and in response at t15, store the received data in RAM and convey an acknowledgment 658 to device 502. Once device 502 has received acknowledgments from all of the active devices in the mirrored layout, an acknowledgement 659 may be conveyed to client 510 at t16. Subsequently, each of devices 501, 502, and 504 may transfer the stored data from RAM to disk at t17, completing the write transaction. It is noted that in alternative embodiments, some of the steps described above may be executed in parallel with each other or in a different order than illustrated.

Figure 7:
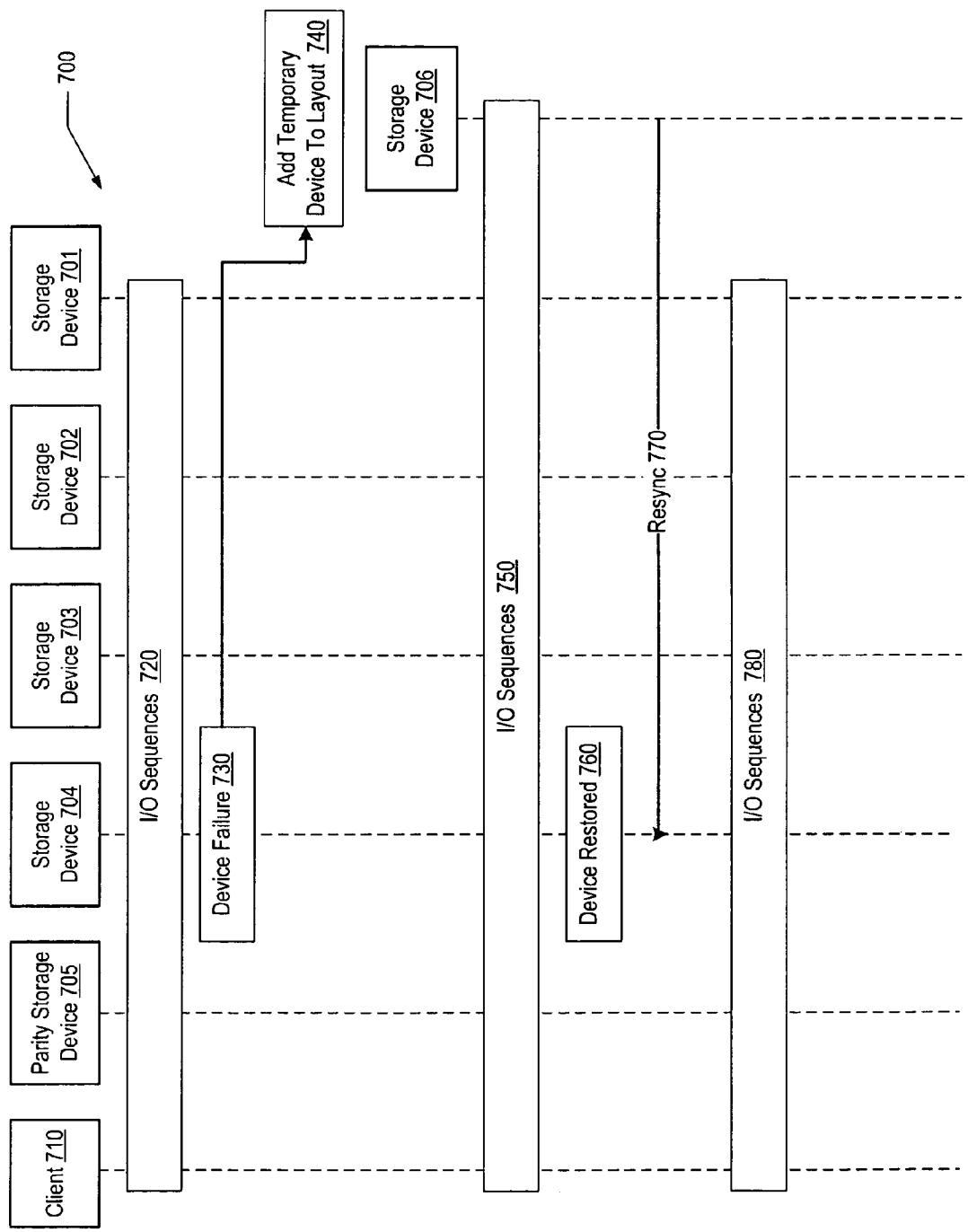
FIG. 7 illustrates one embodiment of a process for handling a device failure in a RAID-5 layout.

Turning now to FIG. 7, one embodiment of a process 700 for handling a device failure in a RAID-5 layout is illustrated. In the illustrated embodiment, a client 710 is shown coupled to a row consisting of data storage devices 701-704, parity storage device 705, and a temporary storage device 706. In the illustrated embodiment, each of devices 701-706 is shown as a separate device for ease of understanding. However, in alternative embodiments, each device represents a storage object and multiple storage objects may be located on a single physical storage device. The data size is assumed to be equal to the capacity of one row. Process 700 may begin with I/O sequences (block 720) between client 710 and storage devices 701-705 that, in one embodiment, may follow the sequences presented in the above referenced patent application until a device failure occurs. By way of example, a failure of device 704 is assumed (block 730). In response to the device failure, a temporary storage device 706 may be added to the RAID-5 layout (block 740). Temporary device 706 may be assigned a clone attribute that points to device 704. Subsequently, I/O sequences (block 750) from client 710 addressed to storage including device 704 may proceed with device 706 replacing device 704 according to processes that are further described below. From the point of view of client 710, device 706 overlays device 704 in the layout with other aspects of the layout remaining unchanged. Temporary device 706 may be configured to keep track of writes that modify data originally stored in device 704. By way of further example, it is assumed that at some point in time, device 704 may be restored (block 760). In response to the restoration of device 704, a resync process 770 may occur in which data that has been stored in device 706 during the time that device 704 was not available is copied to device 704. Subsequently, I/O sequences (block 780) between client 710 and the storage devices may resume according to the processes used in block 720. In alternative embodiments, I/O sequences may resume before the completion of resync process 770. It is noted that in alternative embodiments, some of the steps described above may be executed in parallel with each other or in a different order than illustrated.

Although in the above description, it is assumed that the failed device eventually is restored to operation, in some cases a failure may be sufficiently long-lasting that recovery and data resync are not practical. In such cases, a temporary device may be promoted to permanent status, replacing the failed device in a layout. A decision to promote a temporary device may be made by an MDS after a predetermined period of time or for some other reason, such as a quota failure, enospace failure, etc. as desired. Once a temporary device is promoted, write transactions that are directed to addresses in the temporary device may cause data to be stored in the now-promoted device. In addition, read transactions that are directed to addresses in the now-promoted device may cause data to be cached therein. After a period of time, the now-promoted device may be resynced with the failed device as the data and parity of the RAID-5 layout are rebuilt. The resync process may proceed in a lazy fashion without requiring subsequent file I/O operations to wait.

In a RAID-5 layout, a number of error scenarios may occur. For example, a client may receive an error in response to sending an I/O request to a parity storage device if the whole storage system including the MDS is down. More specifically, the client may receive a timeout error for its I/O request to the parity storage device and may attempt to contact the MDS to get a new layout. When the client tries to contact the MDS to get the new layout, it may receive a timeout for the layout request, as the MDS is also unavailable. At this point the client request may fail with an I/O error.

Alternatively, a client may receive an error in response to sending data to a parity storage device if only the parity storage device has failed. The parity storage device may have failed temporarily, such as from a network partition or reboot operation or permanently due to faulty hardware, etc. In either case, the client may receive a timeout error in response to sending an I/O request to the failed parity storage device. Once the client gets the timeout error, it may send a message to the MDS identifying the layout map and the object that gave the error. At this point the MDS may commence an error recovery for the failed parity storage device and return a new layout to the client.

In a further alternative, a parity storage device may receive an error in response to forwarding data to other storage devices as one or more of the destination storage devices may be unavailable. The parity storage device that forwarded the data, rather than the client as in the previous example, may send a message to the MDS. Once the MDS executes the recovery process, the parity storage device that received the error may retry the failed operation. In a still further alternative, a parity storage device may receive an error after successfully transferring data to other storage devices but before the devices copy the data to disk if one or more devices fail prior to completion of the copy operation. In this case, in addition to contacting the MDS to obtain a new layout, the parity storage device may convey new data to the overlay storage device once it has been identified.

Read transactions may continue with one temporary storage device included in a RAID-5 layout. For example, if a read targets a row in which the parity storage device is the temporary storage device, the read transaction may be completed by the temporary storage device forwarding the request to the targeted storage devices. Alternatively, if a client sends a read request to a parity storage device that is not a temporary storage device and the targeted storage devices of the read do not include the temporary storage device, the parity storage device can forward the read to the targeted storage devices. In a further alternative, if the targeted storage devices of the read do include the temporary storage device, the read transaction may follow a sequence as described in FIG. 8.

Figure 8:
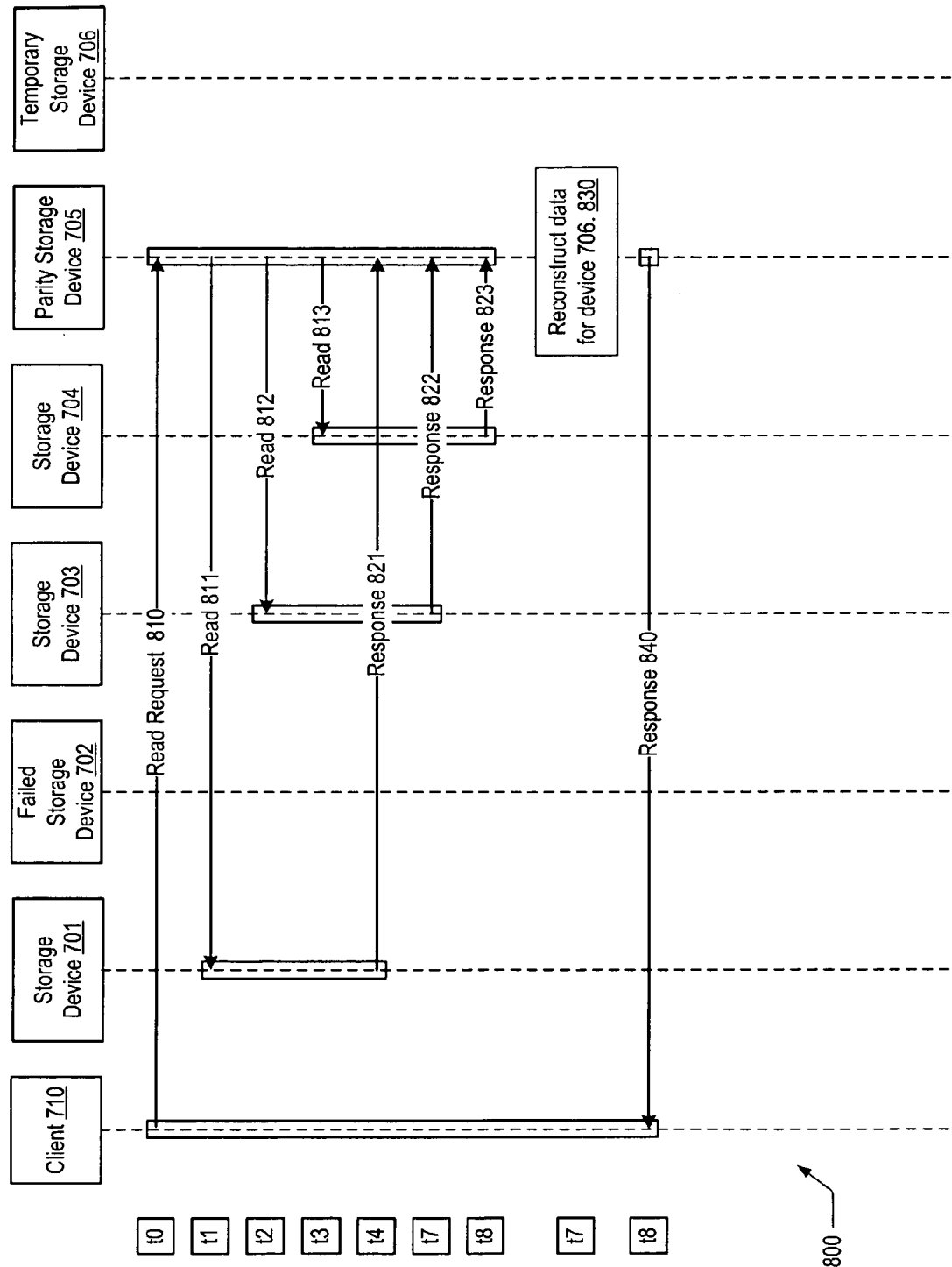
FIG. 8 is a sequence diagram illustrating one embodiment of a read transaction between a client and a partial row in a RAID-5 layout in which the targeted storage devices of the read include a temporary storage device.

FIG. 8 is a sequence diagram illustrating one embodiment of a read transaction between a client and a partial row in a RAID-5 layout in which the targeted storage devices of the read include a temporary storage device. In the illustrated embodiment, a client 710 is shown reading data from a row consisting of data storage devices 701-704, parity storage device 705, and a temporary overlay storage device 706. The data size is assumed to be less than the capacity of one row. At time t0, client 710 may begin a read transaction by sending a read request 810 to the parity storage device identified for the target row from which the data is to be read which, in the illustrated example, is parity storage device 705. Once storage device 705 receives the read request, at times t1, t2, and t3, device 705 may forward read requests 811, 812, and 813 respectively to storage devices 701, 703, and 704, respectively in order to reconstruct the data that was stored in the failed storage device 702 on behalf of temporary storage device 706. At times t4, t5, and t6, storage devices 701, 703, and 704, respectively may convey responses 821, 822, and 823, respectively to parity storage device 705 including data from which the data that is stored in failed storage device 702 may be reconstructed. At time t7, parity storage device 705 may reconstruct the data for temporary device 706 (block 830). At time t8, parity storage device 705 may send response 840 to client 710, completing the read transaction. It is noted that in alternative embodiments, some of the steps described above may be executed in parallel with each other or in a different order than illustrated.

Write transactions may also continue with one temporary storage device included in a RAID-5 layout. For example, if a write targets a full row in the RAID-5 layout, data may be written to every storage device in the row. Temporary storage devices may save new data in the same way that other storage devices do. A temporary parity storage device may store new data and also compute and store new parity values as other storage devices do. A partial stripe write that does not target a temporary storage device may proceed as usual. However, a partial stripe write that does target a temporary storage device may proceed according to the sequence illustrated in FIG. 9.

Figure 9:
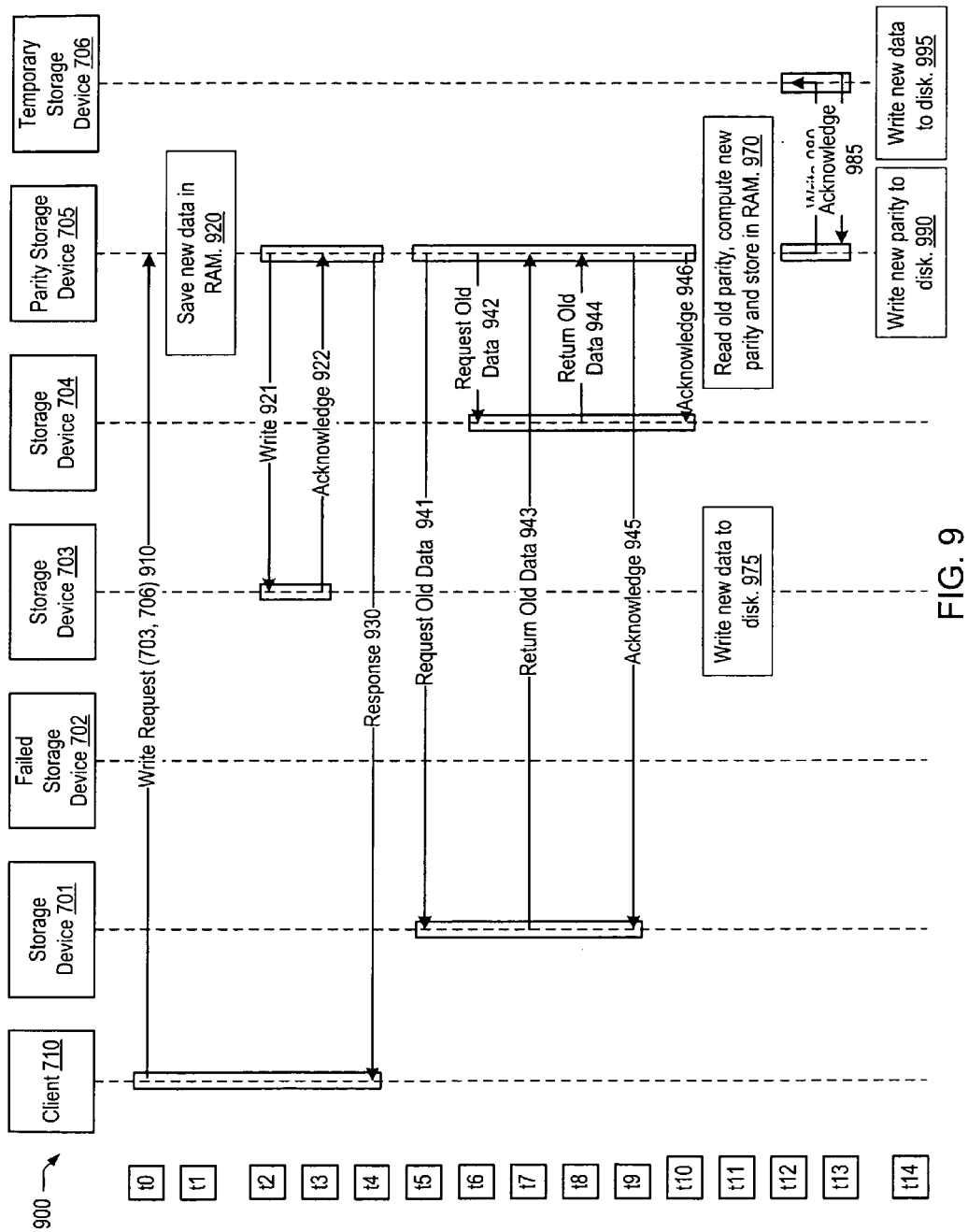
FIG. 9 is a sequence diagram illustrating one embodiment of a write transaction between a client and a partial row in a RAID-5 layout in which the targeted storage devices of the write include a temporary storage device.

FIG. 9 is a sequence diagram illustrating one embodiment of a write transaction between a client and a partial row in a RAID-5 layout in which the targeted storage devices of the write include a temporary storage device. At time t0, client 710 may begin a write transaction by sending a write request 910 targeted to write to storage devices 703 and 706 to parity storage device 705. Once parity storage device 705 receives the write request it may store the received data in RAM (block 920 at time t1) and, at time t2, forward a write request 921 including a copy of the write data to storage device 703. Storage device 703 may receive write request 921 and in response at t3, store the received data in RAM and convey an acknowledgment 922 including a copy of the old data that will be modified by the write transaction to device 705. Device 705 may store the old data received from device 703 for use in calculating new parity values. At times t5 and t6, device 705 may send requests for old data 941 and 942 to devices 701 and 704, respectively. Devices 701 and 704 may return old data to device 705 in responses 943 at time t7 and 944 at time t8, respectively. Device 705 may acknowledge receipt of old data via acknowledgments 945 at time t9 and 946 at time t10 to devices 701 and 704, respectively. At time t11, device 705 may send an acknowledgment to device 703, which may respond by writing the new data that was stored in RAM to disk (block 975). Also, device 705 may use its old parity values and old data values received from devices 701, 703, and 704 to computer new parity values and store them in RAM (block 970). After computing the new parity values, at time t12, device 705 may send new write data to temporary storage device 706 in write request 980. Device 706 may respond with acknowledge 985 at time t13, after receipt of which at time t14, device 705 may write new parity values to disk (block 990) and device 706 may write new data values to disk (block 995, completing the write transaction. Also at time t14 device 705 may convey an acknowledgement (not shown) to client 710 signaling completion of the write transaction. It is noted that in alternative embodiments, some of the steps described above may be executed in parallel with each other or in a different order than illustrated.

Figure 10:
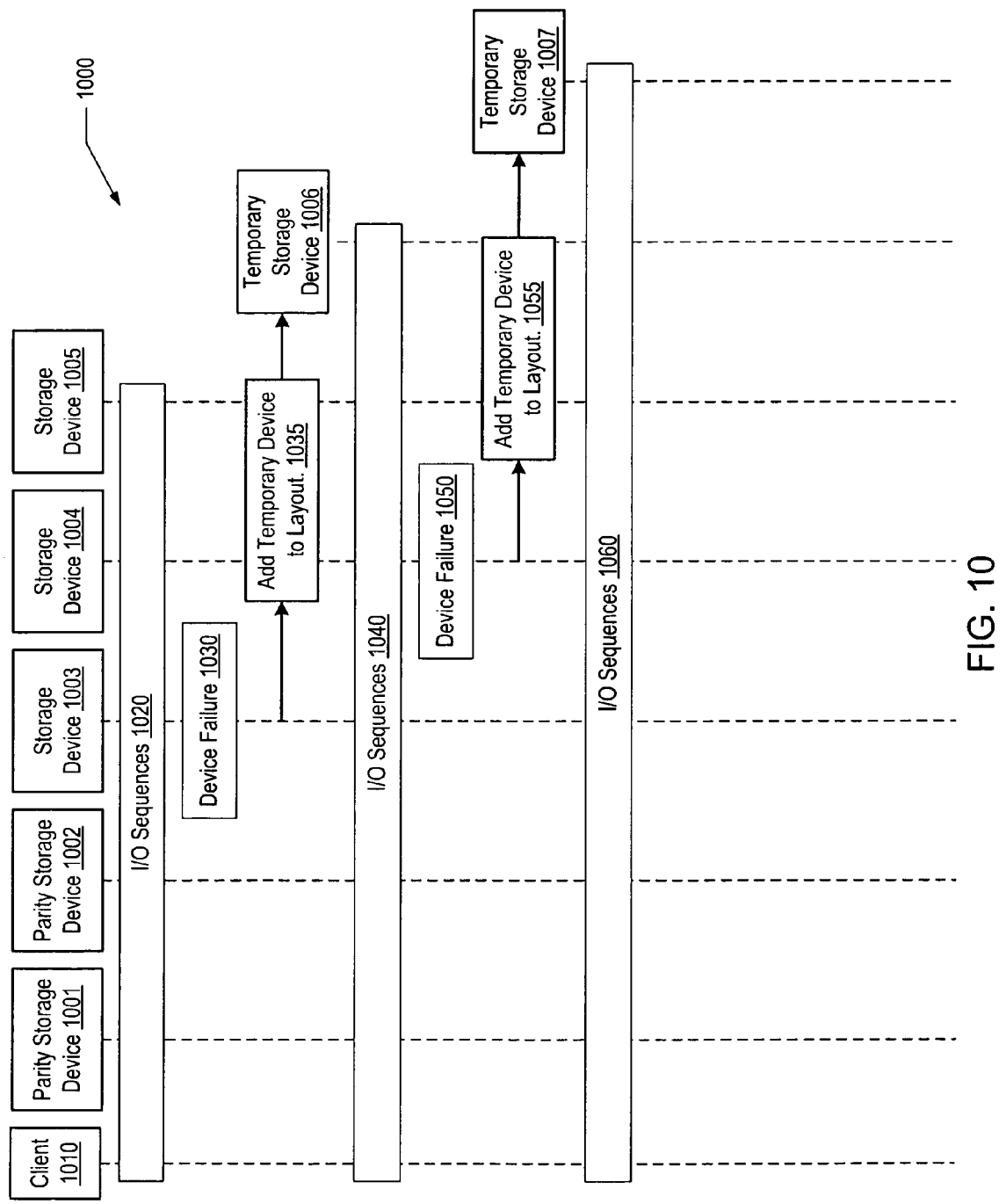
FIG. 10 illustrates one embodiment of a process for handling a device failure in a RAID-6 layout.

Turning now to FIG. 10, one embodiment of a process 1000 for handling a device failure in a RAID-6 layout is illustrated. In the illustrated embodiment, a client 1010 is shown coupled to a row consisting of parity storage device 1001 and 1002, data storage devices 1003-1005, and temporary storage devices 1006 and 1007. In the illustrated embodiment, each of devices 1001-1007 is shown as a separate device for ease of understanding. However, in alternative embodiments, each device represents a storage object and multiple storage objects may be located on a single physical storage device. The data size is assumed to be equal to the capacity of one row. Process 1000 may begin with I/O sequences (block 1020) between client 1010 and storage devices 1001-1005 that, in one embodiment, may follow the sequences presented in the above referenced patent application until a device failure occurs. By way of example, a failure of device 1003 is assumed (block 1030). In response to the device failure, a temporary storage device 1006 may be added to the RAID-6 layout (block 1035). Temporary device 1006 may be assigned a clone attribute that points to device 1003. Subsequently, sequences (block 1040) from client 1010 addressed to storage including device 1003 may proceed with device 1006 replacing device 1003 according to processes that are similar to those used in a RAID-5 layout and that are further described below. From the point of view of client 1010, device 1006 overlays device 1003 in the layout with other aspects of the layout remaining unchanged. Temporary device 1006 may be configured to keep track of writes that modify data originally stored in device 1003. Continuing with the illustrated example, it is assumed that at some point in time, a second device failure may occur (block 1050), in this case, a failure of device 1004. In response to the device failure, a second temporary storage device 1007 may be added to the RAID-6 layout (block 1055). Temporary device 1007 may be assigned a clone attribute that points to device 1004. Subsequently, sequences (block 1060) from client 1010 addressed to storage including device 1004 may proceed with device 1007 replacing device 1004 according to processes that are further described below. Subsequently, devices 1003 and/or 1004 may be restored and resync processes may occur in response that are similar to those described above for mirrored and RAID-5 layouts. Alternatively, temporary devices may be promoted to permanent status, replacing the failed devices in the layout.

In a RAID-6 layout, error scenarios similar to those encountered in a RAID-5 layout may occur. However, I/O transactions may continue with up to two temporary storage devices included in a RAID-6 layout. For example, if a read targets a row in which both parity storage devices are temporary storage device, the read transaction may be completed by one of the temporary storage devices forwarding the request to the targeted storage devices. Alternatively, if only one of the temporary storage devices is a parity storage device and it receives a read request, it may forward he read request to any targeted storage devices that are not overlaid by temporary storage devices. Also, if both of the temporary storage devices are targeted non-parity storage devices, the read transaction may follow a sequence as described in FIG. 11. If one of the temporary storage devices is a parity storage device that receives a read request and a targeted storage device is overlaid by a temporary storage device, the read transaction may follow a sequence as described in FIG. 12.

Figure 11:
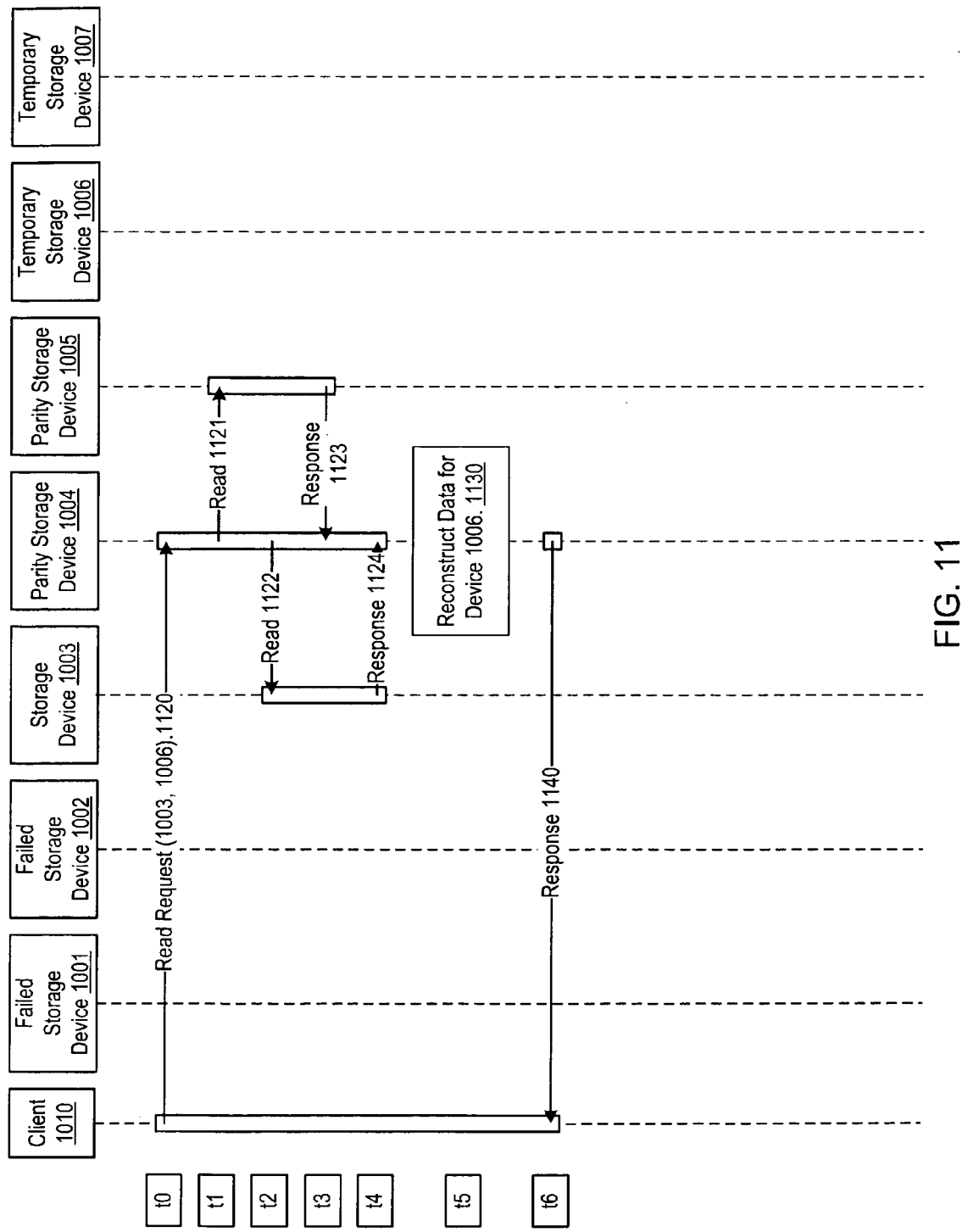
FIG. 11 is a sequence diagram illustrating one embodiment of a read transaction between a client and a partial row in a RAID-6 layout in which one of the targeted storage devices of the read is a temporary storage device and neither temporary storage device is a parity storage device.

FIG. 11 is a sequence diagram illustrating one embodiment of a read transaction between a client and a partial row in a RAID-6 layout in which one of the targeted storage devices of the read is a temporary storage device and neither temporary storage device is a parity storage device. In the illustrated embodiment, a client 1010 is shown reading data from a row consisting of data storage devices 1001-1003, parity storage devices 1004 and 1005, and temporary overlay storage devices 1006 and 1007. The read request is assumed to target devices 1003 and 1006. At time t0, client 1010 may begin a read transaction by sending a read request 1120 to the parity storage device identified for the target row from which the data is to be read which, in the illustrated example, is parity storage device 1004. Once storage device 1004 receives the read request, at times t1 and t2, device 1004 may forward read requests 1121 and 1122 respectively to storage devices 1005 and 1003, respectively in order to reconstruct the data that was stored in the failed storage device 1002 on behalf of temporary storage device 1006. At times t3 and t4, storage devices 1005 and 1003, respectively may convey responses 1123 and 1124, respectively to parity storage device 1004 including data from which the data that is stored in failed storage device 1002 may be reconstructed. At time t5, parity storage device 1004 may reconstruct the data for temporary device 1006 (block 1130). At time 5, parity storage device 1004 may send response 1140 to client 1010, completing the read transaction.

Figure 12:
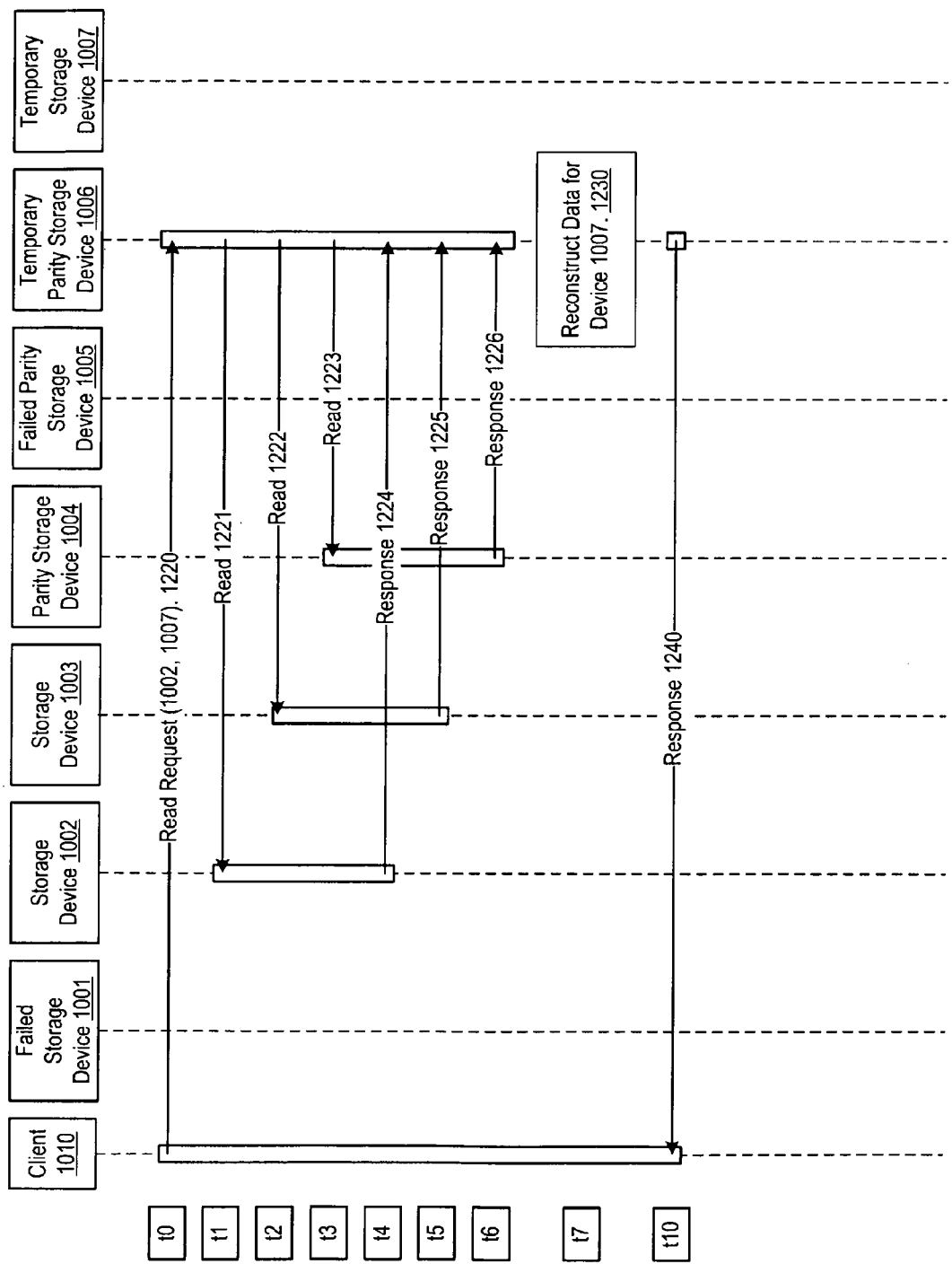
FIG. 12 is a sequence diagram illustrating one embodiment of a read transaction between a client and a partial row in a RAID-6 layout in which one of the temporary storage devices is a parity storage device that receives the read request and the other temporary storage device is one of the targeted storage devices of the read request.

FIG. 12 is a sequence diagram illustrating one embodiment of a read transaction between a client and a partial row in a RAID-6 layout in which one of the temporary storage devices is a parity storage device that receives the read request and the other temporary storage device is one of the targeted storage devices of the read request. In the illustrated embodiment, a client 1010 is shown reading data from a row consisting of data storage devices 1001-1003, parity storage devices 1004 and 1005, and temporary overlay storage devices 1006 and 1007. The read request is assumed to target devices 1002 and 1007. At time t0, client 1010 may begin a read transaction by sending a read request 1220 to the parity storage device identified for the target row from which the data is to be read which, in the illustrated example, is temporary parity storage device 1006. Once storage device 1006 receives the read request, at times t1, t2, and t3, device 1006 may forward read requests 1221, 1222, and 1223 respectively to storage devices 1002, 1003, and 1004, respectively in order to reconstruct the data that was stored in the failed storage device 1001 on behalf of temporary storage device 1007. At times t4, t5, and t6, storage devices 1002, 1003, and 1004, respectively may convey responses 1224, 1225, and 1226, respectively to parity storage device 1006 including data from which the data that is stored in failed storage device 1001 may be reconstructed. At time t7, parity storage device 1006 may reconstruct the data for temporary device 1007 (block 1230). At time t8, parity storage device 1006 may send response 1240 to client 1010, completing the read transaction. It is noted that in alternative embodiments, some of the steps described above may be executed in parallel with each other or in a different order than illustrated.

Write transactions may also continue with up to two temporary storage device included in a RAID-6 layout. For example, if a write targets a full row in the RAID-6 layout, data may be written to every storage device in the row. Temporary storage devices may save new data in the same way that other storage devices do. A temporary parity storage device may store new data and also compute and store new parity values as other storage devices do. A partial stripe write that does not target a temporary storage device and is not sent to a temporary parity storage device may proceed as usual. However, a partial stripe write that does target a temporary storage device may proceed according to the sequence illustrated in FIG. 13.

Figure 13:
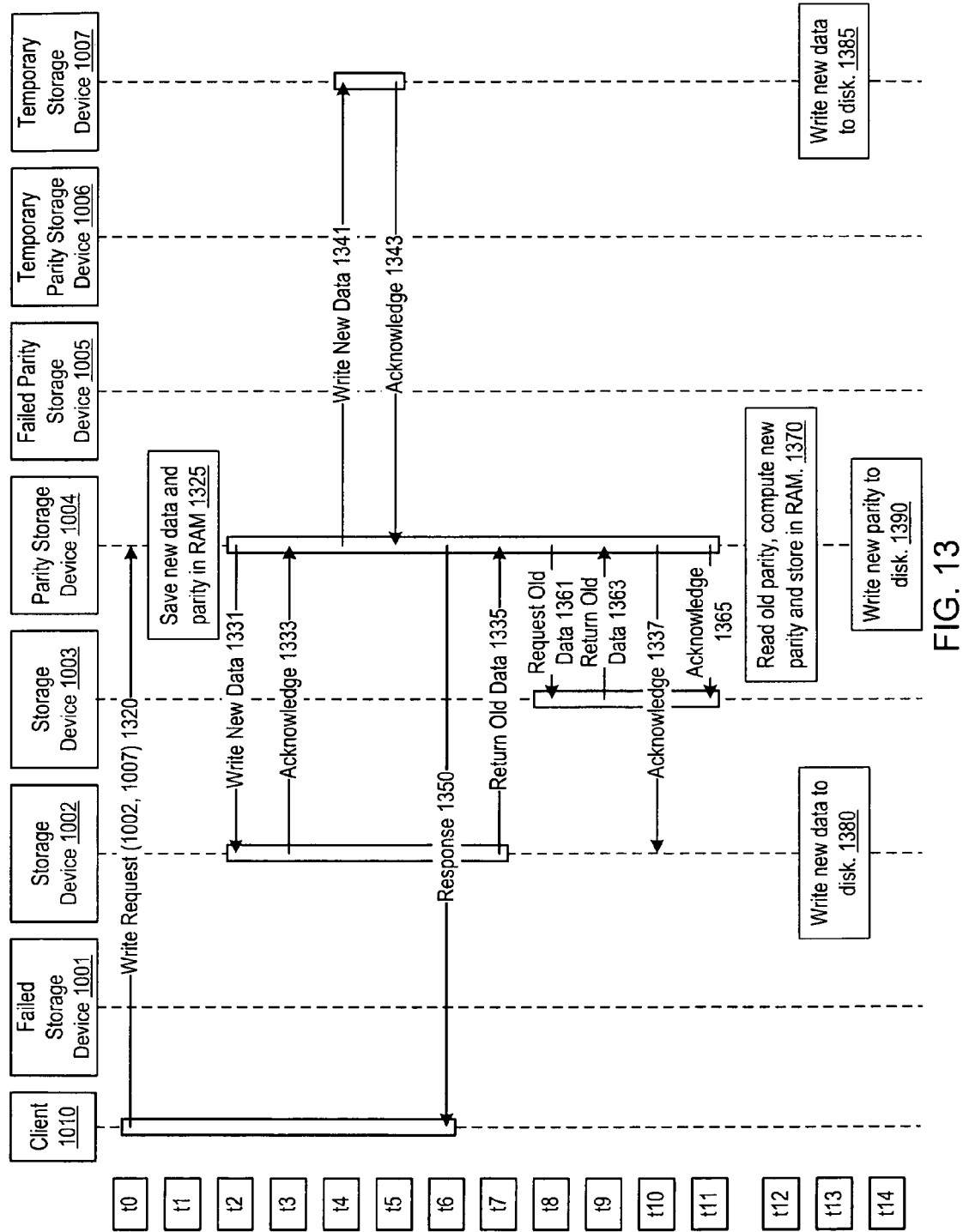
FIG. 13 is a sequence diagram illustrating one embodiment of a write transaction between a client and a partial row in a RAID-6 layout in which the targeted storage devices of the write include a temporary storage device.

FIG. 13 is a sequence diagram illustrating one embodiment of a write transaction between a client and a partial row in a RAID-6 layout in which the targeted storage devices of the write include a temporary storage device. At time t0, client 1010 may begin a write transaction by sending a write request 1320 targeted to write to storage devices 1002 and 1007 to parity storage device 1004. Once parity storage device 1004 receives the write request, it may store the received data in RAM (block 1325 at time t1) and, at time t2, forward a write request 1331 including a copy of the write data to storage device 1002. Storage device 1002 may receive write request 1331 and in response at t3, store the received data in RAM and convey an acknowledgment 1333 to device 1004. Device 1004 may also forward a write request 1341 including a copy of the write data to temporary storage device 1007 at time t4. Storage device 1007 may receive write request 1341 and in response at t5, store the received data in RAM and convey an acknowledgment 1343 to device 1004. Device 1004 may, after receiving acknowledgements from both devices 1002 and 1007, convey a write completion response 1350 to client 1010 at time t6. At time t7, device 1002 may return old data for use in calculating new parity values to device 1004 in response 1335. At time t8, device 1004 may send a request for old data 1361 to device 1003. Device 1003 may return old data to device 1004 in response 1363 at time t9. Device 1004 may store the old data received from devices 1002 and 1003 for use in calculating new parity values. Device 1004 may acknowledge receipt of old data via acknowledgments 1337 and 1365 at times t10 and t11 to devices 1002 and 1003, respectively. In response to receiving old data from devices 1002 and 1003, device 1004 may use its old parity values and old data values received from devices 701, 703, and 704 to computer new parity values and store them in RAM (block 1370 at time t12). At time t13, devices 1002 and 1007 may write new data that was stored in RAM to disk (blocks 1380 and 1385). Also, at time t14, device 1004 may write new parity values to disk (block 1390), completing the write transaction. It is noted that in alternative embodiments, some of the steps described above may be executed in parallel with each other or in a different order than illustrated.

Figure 14:
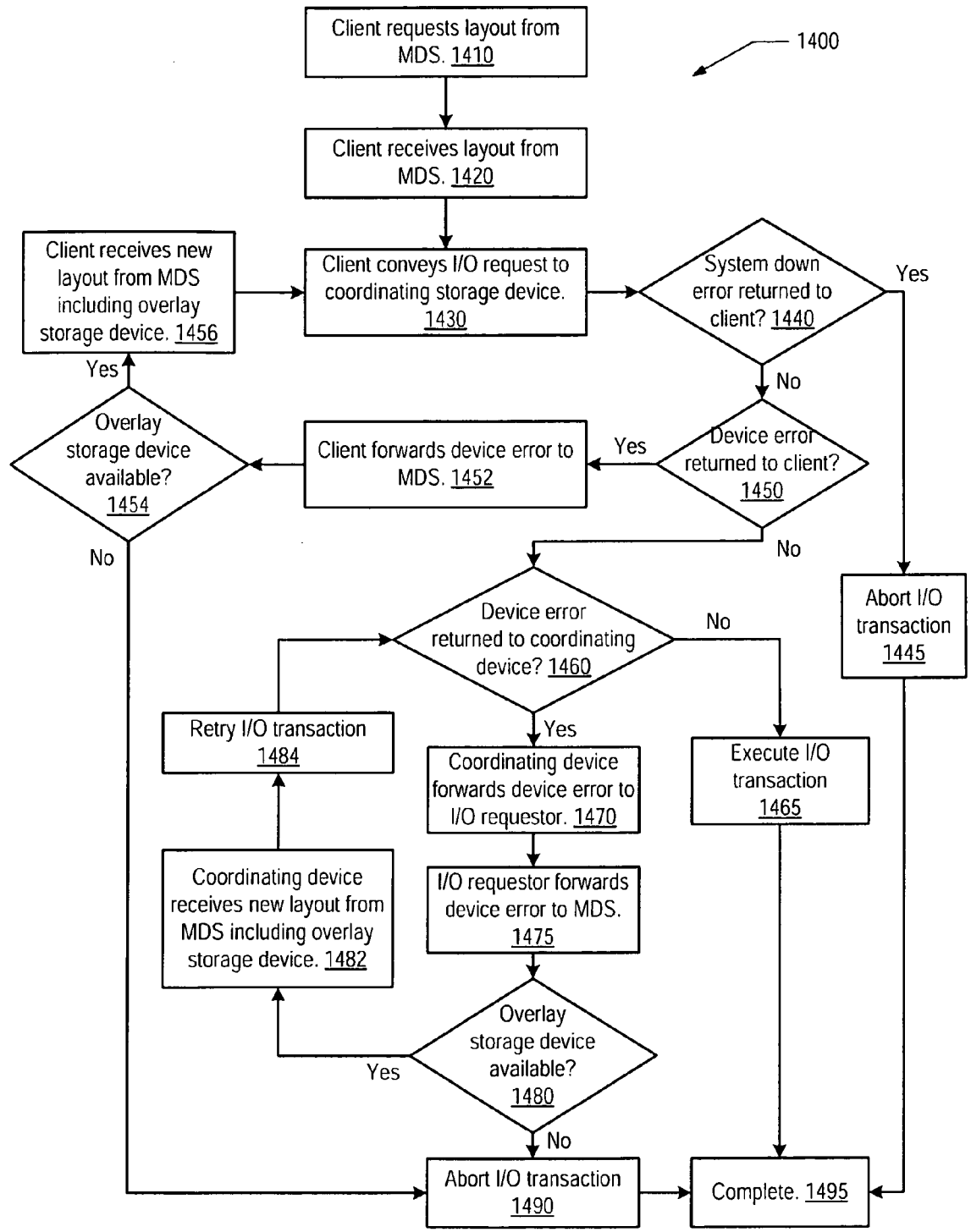
FIG. 14 illustrates one embodiment of a process that may be used during an I/O transaction between a client and a row in a storage device layout in the event of a storage device failure.

FIG. 14 illustrates one embodiment of a process 1400 that may be used during an I/O transaction between a client and a row in a storage device layout in the event of a storage device failure. Process 1400 may begin when a client requests a layout from an MDS (block 1410). The requesting client may receive a response including a layout and identifying a coordinating storage device from the MDS (block 1420). Once the coordinating storage device is known, the client may convey an I/O request to the coordinating device (block 1430). If the client receives a system down error in response to the I/O request (decision block 1440), the I/O transaction may be aborted (block 1445), completing process 1400 (block 1495). A system down error may indicate, for example, that most or all of the storage subsystem including the MDS is unavailable. If, instead, the client receives a device error in response to the I/O request, indicating, for example, that although the MDS is available, the indicated coordinating device is not available (decision block 1450), the client may forward the device error to the MDS (block 1452). If the MDS determines that an overlay storage device is available (decision block 1454), the MDS may convey a new layout to the client including information identifying the overlay device (block 1456) and the flow of process 1400 may return to block 1430. If the MDS determines that an overlay storage device is not available (decision block 1454), the I/O transaction may be aborted (block 1490), completing process 1400 (block 1495).

If the client does not receive a system down error or a device error in response to the I/O request, but a device error is returned to the coordinating device during the I/O transaction (decision block 1460), the coordinating device may forward the device error to the device that initiated the I/O request (block 1470). Information about the device error may also be forwarded to the device that initiated the I/O request, such as which storage device gave the error, what type of error occurred, etc. The device that initiated the I/O request may forward the device error to the MDS (block 1475). If the MDS determines that an overlay storage device is available (decision block 1480), the MDS may convey a new layout to the coordinating device including information identifying the overlay device (block 1482) and the I/O transaction may be retired (block 1484). Process 1400 may then resume at block 1460. If the MDS determines that an overlay storage device is not available (decision block 1480), the I/O transaction may be aborted (block 1490), completing process 1400 (block 1495). If the client does not receive a system down error or a device error in response to the I/O request and the coordinating device does not receive any device error during the I/O transaction (decision block 1460), the transaction may be executed (block 1465), completing process 1400 (block 1495).

Figure 15:
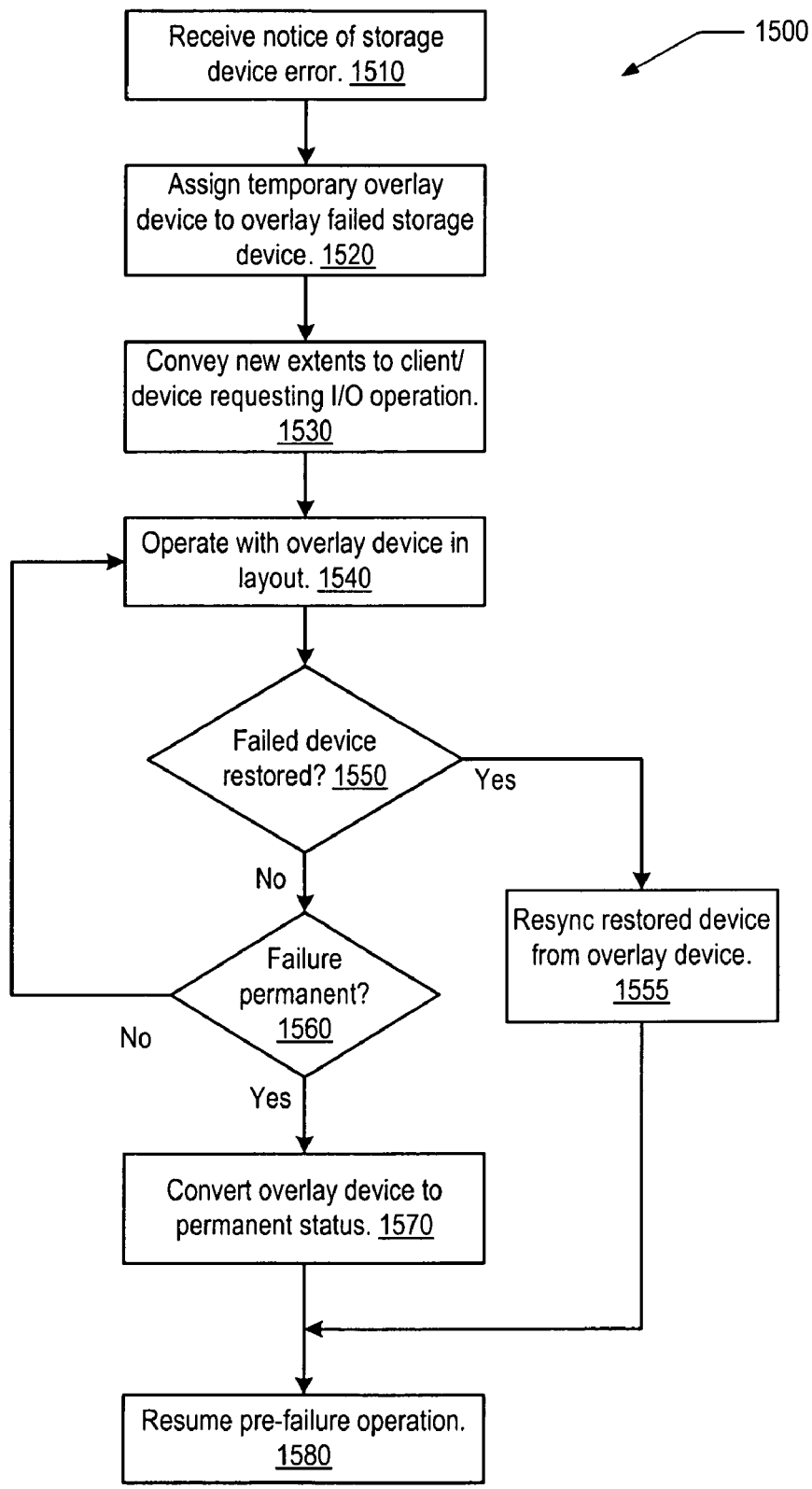
FIG. 15 illustrates one embodiment of a process that may be used to overlay and restore failed storage devices in a storage subsystem.

FIG. 15 illustrates one embodiment of a process 1500 that may be used to overlay and restore failed storage devices in a storage subsystem. Process 1500 may begin with a notification that a storage device error has occurred (block 1510). For example, an MDS may receive a notification from either a client or one of the storage devices in a storage subsystem that communication with a storage device is unavailable. In response to the device error notification, a temporary overlay device may be assigned to overlay the failed storage device (block 1520). Once the overlay device has been assigned, requests for storage extents during an I/O operation may be answered by conveying new extents including the overlay device to the requesting client or device (block 1530). Subsequent I/O operations may include the overlay device in place of the failed device (block 1540). If the failed device is restored (decision block 1550), it may be resynced from the overlay device (block 1555). More specifically, the regions of the overlay device that have been modified by writes may be used as a log of regions that are to be updated in the restored device. For example, in one embodiment, the overlay device may be used as a dirty region log (DRL) for the newly restored device. Once the newly restored device is resynced, pre-failure operations of the storage subsystem may resume (block 1580). If the failed device is not restored (decision block 1550) and the failure is not deemed to be permanent (decision block 1560), I/O operations may continue to include the overlay device in place of the failed device (block 1540). A failure may be deemed to be permanent for a variety of reasons, such as if the failed device is unavailable for a predetermined period of time, if an operator input designates the failure to be permanent, etc. If the failed device is deemed to be permanently failed, the overlay device may be assigned permanent status in the storage subsystem (block 1570). As a permanent member of a layout, the data that was stored in the failed device may be recreated in the overlay device and pre-failure operations of the storage subsystem may resume (block 1580).

Figure 16:
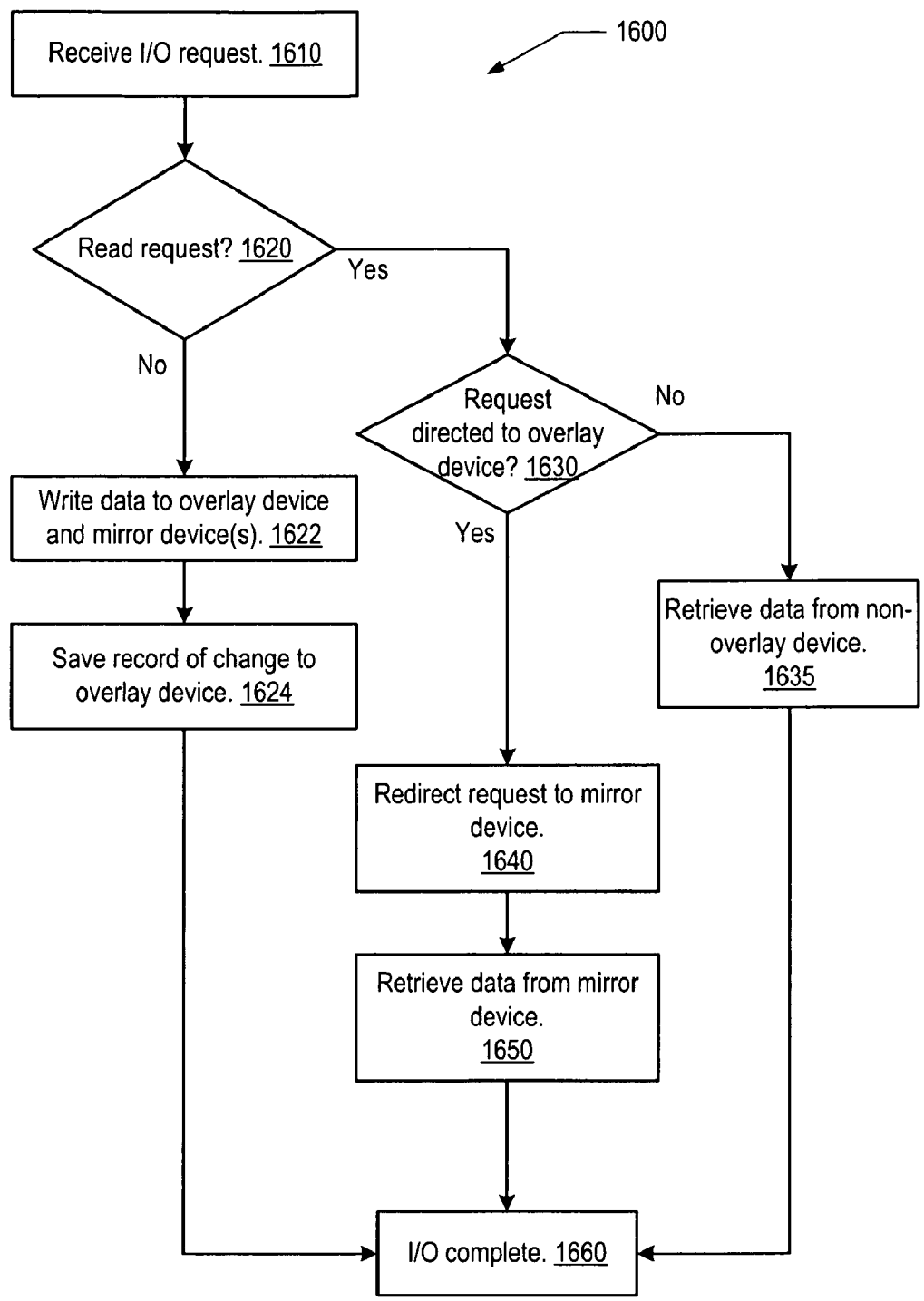
FIG. 16 illustrates one embodiment of a process for handling I/O requests in a mirrored layout in which an overlay storage device temporarily overlays a failed storage device.

FIG. 16 illustrates one embodiment of a process 1600 for handling I/O requests in a mirrored layout in which an overlay storage device temporarily overlays a failed storage device. Process 1600 may begin when an I/O request is received (block 1610). If the received request is a read request (decision block 1620), and the request is not directed to an overlay device (decision block 1630), the read data may be retrieved from the non-overlay device (block 1635), completing the I/O operation (block 1660). If a read request is directed to an overlay device (decision block 1630), the read request may be redirected to a mirror device (block 1640). Read data may then be retrieved from the mirror device (block 1650), completing the I/O operation (block 1660.). If the received request is a write request (decision block 1620), data may be written to the overlay device and to the mirrored device(s) in the layout (block 1622). A record of the changes made to the overlay device may also be stored in the overlay device (block 1624) to enable resynchronization of the failed device, should the failed device be subsequently restored. Once write data has been store in the overlay device, the I/O operation is complete (block 1660).

Figure 17:
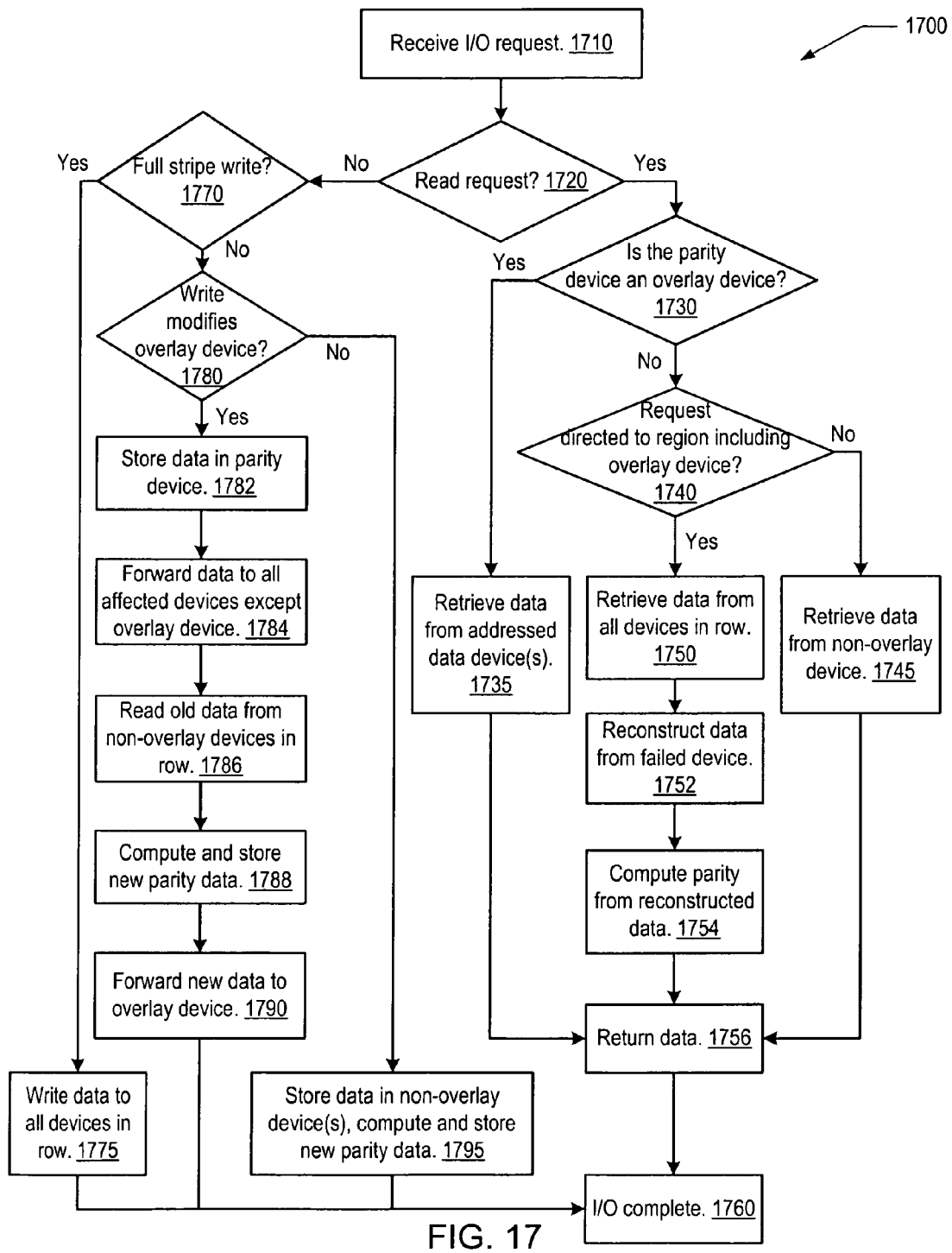
FIG. 17 illustrates one embodiment of a process for handling I/O requests in a RAID-5 layout in which an overlay storage device temporarily overlays a failed storage device.

FIG. 17 illustrates one embodiment of a process 1700 for handling I/O requests in a RAID-5 layout in which an overlay storage device temporarily overlays a failed storage device. Process 1700 may begin when an I/O request is received (block 1710). If the received request is a read request (decision block 1720), and the parity device in the RAID-5 layout is an overlay device (decision block 1730), the read data may be retrieved from the addressed devices (block 1735), and the read data returned (block 1756), completing the I/O operation (block 1760). If the parity device is not an overlay device and the read request is not directed to a region that includes an overlay device (decision block 1740), the read data may be retrieved from the non-overlay devices (block 1745), and the read data returned (block 1756), completing the I/O operation (block 1760). If a read request is directed to a region that includes an overlay device (decision block 1740), data may be retrieved from all the non-overlay storage devices in the layout (block 1750). Data from the failed device may then be reconstructed from the retrieved data (block 1752), new parity values computed and stored (block 1754), and the read data returned (block 1756), completing the I/O operation (block 1760).

If the received request is a write request (decision block 1720), and if the write request targets a full stripe (decision block 1770), data may be written to all of the storage devices in the row (block 1775), completing the I/O operation (block 1760). If a write request targets a partial row and is not a request to modify an overlay device (decision block 1780), data may be stored in the non-overlay devices and new parity values computed and stored (block 1795), completing the I/O operation (block 1760). If a write request targets a partial row and is a request to modify an overlay device (decision block 1780), the write data may be stored in the parity device (block 1782) and forwarded to all the targeted devices except the overlay device (block 1784). Old data from the non-overlay devices in the row may then be read and returned to the parity device (block 1786). The parity device may then compute and store new parity values (block 1788) and forward the new data to the overlay device (block 1790). Once the new data has been stored in the overlay device, the I/O operation is complete (block 1760).

Figure 18:
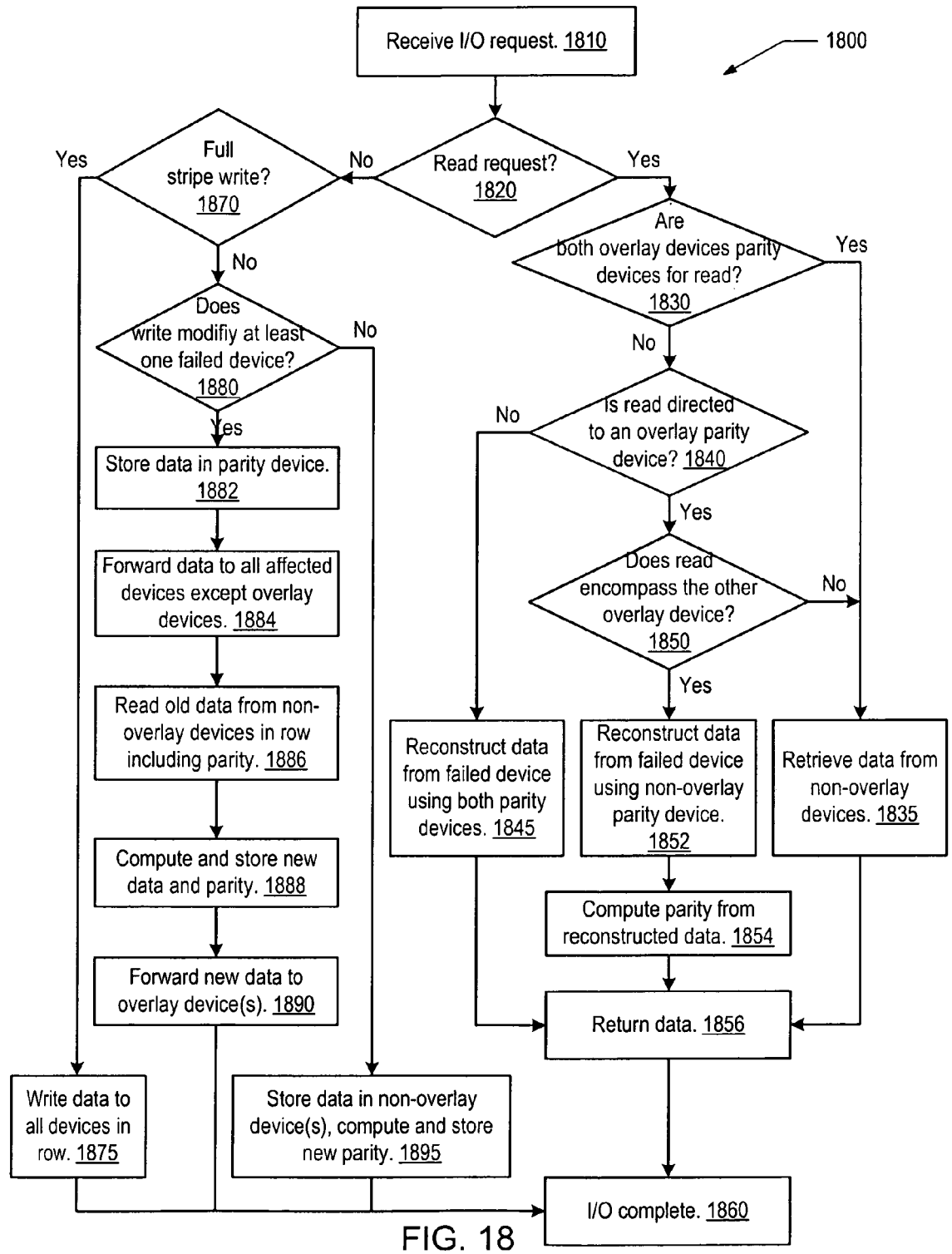
FIG. 18 illustrates one embodiment of a process for handling I/O requests in a RAID-6 layout in which two overlay storage devices temporarily overlay failed storage devices.

FIG. 18 illustrates one embodiment of a process 1800 for handling I/O requests in a RAID-6 layout in which two overlay storage devices temporarily overlay failed storage devices. It is noted that a single device failure in a RAID-6 layout may be handled in the same manner as a single device failure in a RAID-5 layout. Process 1800 may begin when an I/O request is received (block 1810). If the received request is a read request (decision block 1820), and both parity devices in the RAID-6 layout are overlay devices (decision block 1830), the read data may be retrieved from the addressed devices (block 1835), and the read data returned (block 1856), completing the I/O operation (block 1860). If the read request is directed to a non-overlaid parity device (decision block 1840), the read data may be reconstructed for any overlaid devices using the parity values in the row (block 1845), other read data retrieved from non-overlaid devices, and the read data returned (block 1856), completing the I/O operation (block 1860). If one of the two overlaid devices is the parity device to which a read is directed (decision block 1840), and the read does not encompass the other overlaid device (decision block 1850), the read data may be retrieved from the addressed devices (block 1835), and the read data returned (block 1856), completing the I/O operation (block 1860). If one of the two overlaid devices is the parity device to which a read is directed (decision block 1840), and the read encompasses the other overlaid device (decision block 1850), read data may be reconstructed for the overlaid device using the non-overlaid parity device's stored values (block 1852). New parity values may then be computed from the reconstructed data (block 1854) and the read data returned (block 1856), completing the I/O operation (block 1860).

If the received request is a write request (decision block 1820), and if the write request targets a full stripe (decision block 1870), data may be written to all of the storage devices in the row (block 1875), completing the I/O operation (block 1860). If a write request targets a partial row and is not a request to modify an overlay device (decision block 1880), data may be stored in the non-overlay devices and new parity values computed and stored (block 1895), completing the I/O operation (block 1860). If a write request targets a partial row and is a request to modify at least one overlay device (decision block 1880), the write data may be stored in the parity device (block 1882) and forwarded to all the targeted devices except the overlay devices (block 1884). Old data from the non-overlay devices in the row may then be read and returned to the parity device (block 1886). The parity device may then compute and store new parity values (block 1888) and forward the new data to the overlay device(s) (block 1890). Once the new data has been stored in the overlay device(s), the I/O operation is complete (block 1860).

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
    a client; and
    a storage subsystem coupled to the client;
    wherein the computer system is configured to:
        detect a failure of a storage region including at least a portion of a storage device;
        configure an overlay storage device to temporarily overlay the failed region, in response to detecting said failure;
        maintain an association between the overlay storage device and the failed region; and
        maintain a record of changes made to the overlay storage device while the region is in a failed state;
    wherein the storage subsystem comprises a plurality of storage locations addressable as rows and columns in an array, each column of the array being stored in a separate storage device of a plurality of storage devices configured to store data, and wherein for a given row in the array, a storage device of the plurality of storage devices that is storing data corresponding to the given row is selected to act as a coordinating storage device configured to coordinate reads and writes of data for the given row.

2. The system as recited in claim 1, wherein in response to detecting that the failed region has been restored, the computer system is further configured to:
    use the association to identify the overlay storage device; and
    use the record of changes made to the overlay storage device to resynchronize the failed region.

3. The system as recited in claim 1, wherein in response to determining that the failure of the region is permanent, the computer system is further configured to:
    use the association to identify the overlay storage device; and
    copy data previously stored in the failed region to the overlay storage device.

4. The system as recited in claim 1, wherein write data for a write transaction targeted to a particular row of the storage subsystem is conveyed to a single storage device of the plurality of storage devices designated as a coordinating storage device for the particular row and storing data for the particular row, and wherein the single storage device forwards portions of the write data to other storage devices containing data for the particular row as needed.

5. The system as recited in claim 4, wherein for a given row in the array, a coordinating storage device is further configured to:
    receive a write request from a client to write data to a location corresponding to the overlay device;
    calculate and store redundancy values based on old data retrieved from non- overlay devices in the given row; and
    forward write data to devices in the given row including at least the overlay device.

6. The system as recited in claim 1, wherein for a given row in the array, the coordinating storage device is further configured to:
    receive a read request from a client to read data from a location corresponding to the overlay device; and
    in response to receiving said read request:
        reconstruct data from the failed region using data retrieved from non- overlay devices in the given row; and
        return the reconstructed data to the client.

7. The system as recited in claim 4, wherein if the write data corresponds to a partial row, the single storage device receives said write data even if none of said write data is to be stored in the single storage device.

8. A method of maintaining data in storage locations of a storage subsystem, the method comprising:
    detecting a failure of a storage region including at least a portion of a storage device;
    configuring an overlay storage device to temporarily overlay the failed region, in response to detecting said failure;
    maintaining an association between the overlay storage device and the failed region; and
    maintaining a record of changes made to the overlay storage device while the region is in a failed state;

wherein the storage subsystem comprises a plurality of storage locations addressable as rows and columns in an array, each column of the array being stored in a separate storage device of a plurality of storage devices configured to store data, and wherein for a given row in the array, a storage device of the plurality of storage devices that is storing data corresponding to the given row is selected to act as a coordinating storage device configured to coordinate reads and writes of data for the given row.

9. The method of claim 8, wherein in response to detecting that the failed region has been restored, the method further comprises:
using the association to identify the overlay storage device; and
using the record of changes made to the overlay storage device to resynchronize the failed region.

10. The method of claim 8, wherein in response to determining that the failure of the region is permanent, the method further comprises:
using the association to identify the overlay storage device; and
copying data previously stored in the failed region to the overlay storage device.

11. The method of claim 8, wherein write data for a write transaction targeted to a particular row of the storage subsystem is conveyed to a single storage device of the plurality of storage devices designated as a coordinating storage device for the particular row and storing data for the particular row, and wherein the method comprises the single storage device forwarding portions of the write data to other storage devices containing data for the particular row as needed.

12. The method of claim 11, wherein for a given row in the array, the method further comprises the coordinating storage device:
receiving a write request from a client to write data to a location corresponding to the overlay device;
calculating and storing redundancy values based on old data retrieved from non- overlay devices in the given row; and
forwarding write data to devices in the given row including at least the overlay device.

13. The method of claim 8, wherein for a given row in the array, the method further comprises the coordinating storage device:
receiving a read request from a client to read data from a location corresponding to the overlay device; and
in response to receiving said read request:
reconstructing data from the failed region using data retrieved from non-overlay devices in the given row; and
returning the reconstructed data to the client.

14. The method of claim 11, wherein if the write data corresponds to a partial row, the single storage device receives said write data even if none of said write data is to be stored in the single storage device.

15. A computer readable storage medium storing computer instructions that are executable by a processor to:
access storage locations of a storage subsystem;
detect a failure of a storage region including at least a portion of a storage device;
configure an overlay storage device to temporarily overlay the failed region, in response to detecting said failure;
maintain an association between the overlay storage device and the failed region; and
maintain a record of changes made to the overlay storage device while the region is in a failed state;
wherein the storage subsystem comprises a plurality of storage locations addressable as rows and columns in an array, each column of the array being stored in a separate storage device of a plurality of storage devices configured to store data, and wherein for a given row in the array, a storage device of the plurality of storage devices that is storing data corresponding to the given row is selected to act as a coordinating storage device configured to coordinate reads and writes of data for the given row.

16. The computer readable storage medium of claim 15, wherein in response to detecting that the failed region has been restored, the instructions are further executable by a processor to:
use the association to identify the overlay storage device; and
use the record of changes made to the overlay storage device to resynchronize the failed region.

17. The computer readable storage medium of claim 15, wherein in response to determining that the failure of the region is permanent, the instructions are further executable by a processor to:
use the association to identify the overlay storage device; and
copy data previously stored in the failed region to the overlay storage device.

18. The computer readable storage medium of claim 15, wherein write data for a write transaction targeted to a particular row of the storage subsystem is conveyed to a single storage device of the plurality of storage devices designated as a coordinating storage device for the particular row and storing data for the particular row, and wherein the program instructions cause the single storage device to forward portions of the write data to other storage devices containing data for the particular row as needed.

19. The computer readable storage medium of claim 18, wherein for a given row in the array, the instructions are further executable to:
receive a read request from a client to read data from a location corresponding to the overlay device;
reconstruct data from the failed region using data retrieved from non-overlay devices in the given row; and
return the reconstructed data to the client.

20. The computer readable storage medium of claim 18, wherein if the write data corresponds to a partial row, the single storage device receives said write data even if none of said write data is to be stored in the single storage device.

* * * * *